United States Patent
Karimi Eskandary

(10) Patent No.: US 11,138,843 B2
(45) Date of Patent: Oct. 5, 2021

(54) SYSTEMS AND METHODS FOR GENERATING A DRIVE SIGNAL HAVING A BRAKING PORTION

(71) Applicant: Immersion Corporation, San Jose, CA (US)

(72) Inventor: Peyman Karimi Eskandary, Montreal (CA)

(73) Assignee: IMMERSION CORPORATION, San Francisco, CA (US)

(*) Notice: Subject to any disclaimer, the term of this patent is extended or adjusted under 35 U.S.C. 154(b) by 0 days.

(21) Appl. No.: 16/681,938

(22) Filed: Nov. 13, 2019

(65) Prior Publication Data

US 2021/0142629 A1 May 13, 2021

(51) Int. Cl.
- *G08B 6/00* (2006.01)
- *B06B 1/06* (2006.01)
- *G06F 3/01* (2006.01)
- *B60Q 9/00* (2006.01)

(52) U.S. Cl.
CPC .............. *G08B 6/00* (2013.01); *B06B 1/0644* (2013.01); *G06F 3/016* (2013.01); *B60Q 9/00* (2013.01)

(58) Field of Classification Search
CPC ...................................................... G08B 6/00
See application file for complete search history.

(56) References Cited

U.S. PATENT DOCUMENTS

| | | | | |
|---|---|---|---|---|
| 6,154,198 A | * | 11/2000 | Rosenberg | A63F 13/24 345/161 |
| 7,129,824 B2 | * | 10/2006 | Cranfill | B06B 1/0276 340/407.1 |
| 8,593,269 B2 | * | 11/2013 | Grant | G08B 6/00 340/407.2 |
| 2010/0309142 A1 | | 12/2010 | Cruz-Hernandez et al. | |
| 2011/0075835 A1 | | 3/2011 | Hill | |
| 2018/0033262 A1 | | 2/2018 | Shah et al. | |
| 2018/0321748 A1 | | 11/2018 | Rao et al. | |
| 2019/0163277 A1 | | 5/2019 | Kanai | |

OTHER PUBLICATIONS

International Search Report dated Feb. 24, 2021 in corresponding International Patent Application No. PCT/US2020/058559.
Written Opinion dated Feb. 24, 2021 in corresponding International Patent Application No. PCT/US2020/058559.

* cited by examiner

*Primary Examiner* — K. Wong
(74) *Attorney, Agent, or Firm* — Medler Ferro Woodhouse & Mills PLLC

(57) ABSTRACT

A haptic-enabled system, non-transitory computer-readable medium, and method for controlling a haptic actuator are presented. The haptic-enabled system comprises the haptic actuator, a movement sensor, and a control circuit. The control circuit is configured to: generate a driving portion of a drive signal; apply the driving portion of the drive signal to the haptic actuator to generate movement of one or more portions of the haptic-enabled system; determine (e.g., measure) the movement of the one or more portions of the haptic-enabled system; determine a time-varying correction signal for reducing the movement; generate a braking portion of the drive signal based on a combination of the time-varying correction signal and a defined offset; and apply the braking portion of the drive signal to the haptic actuator. Numerous other aspects are provided.

25 Claims, 15 Drawing Sheets

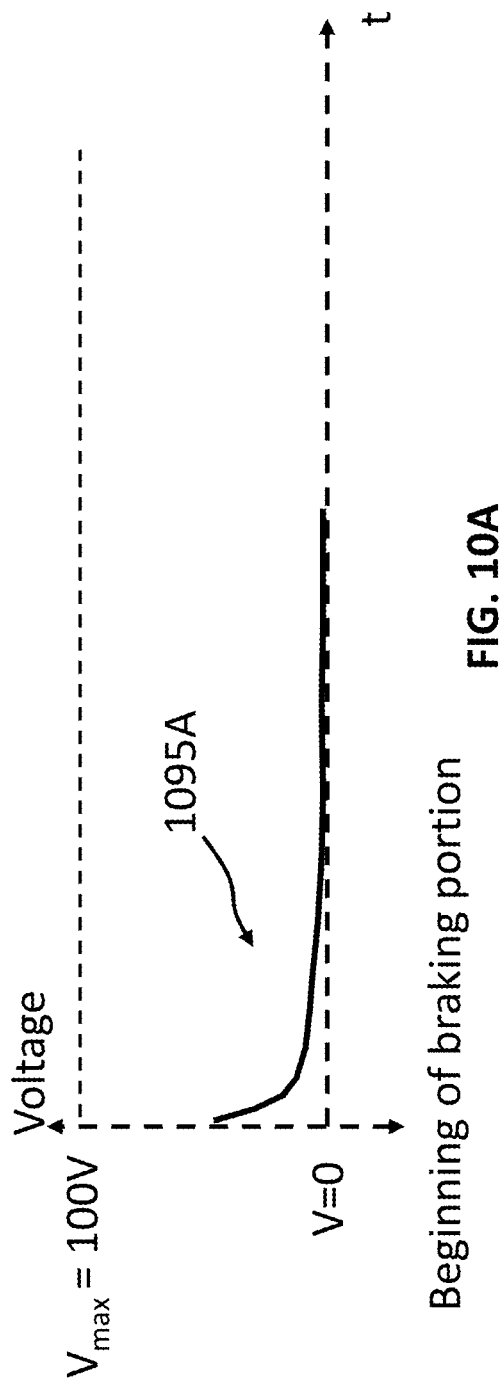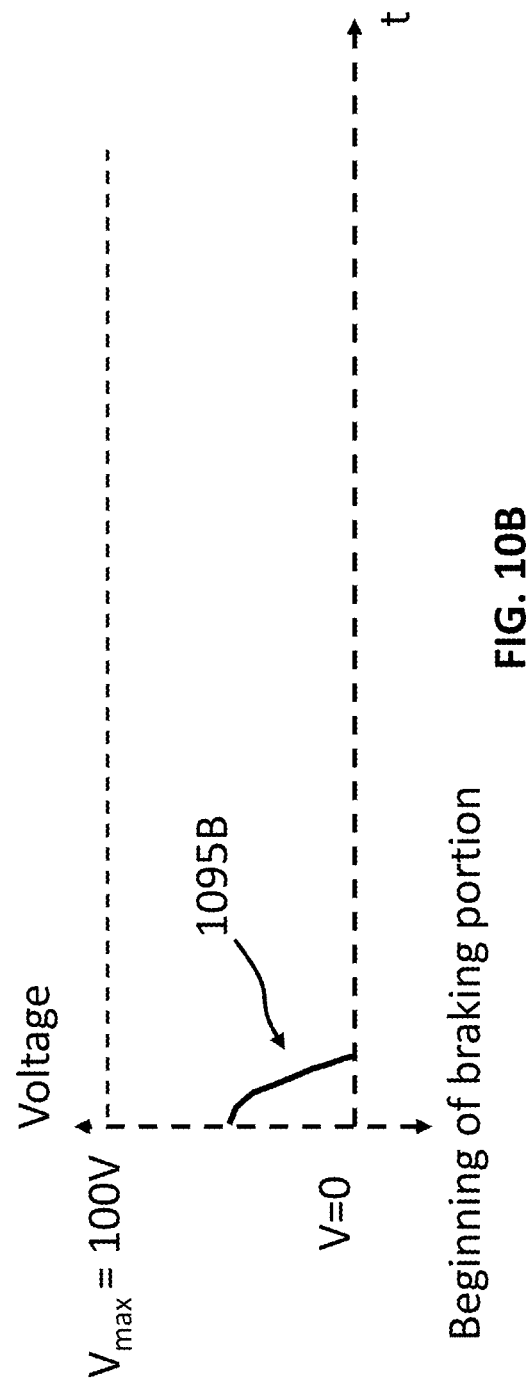

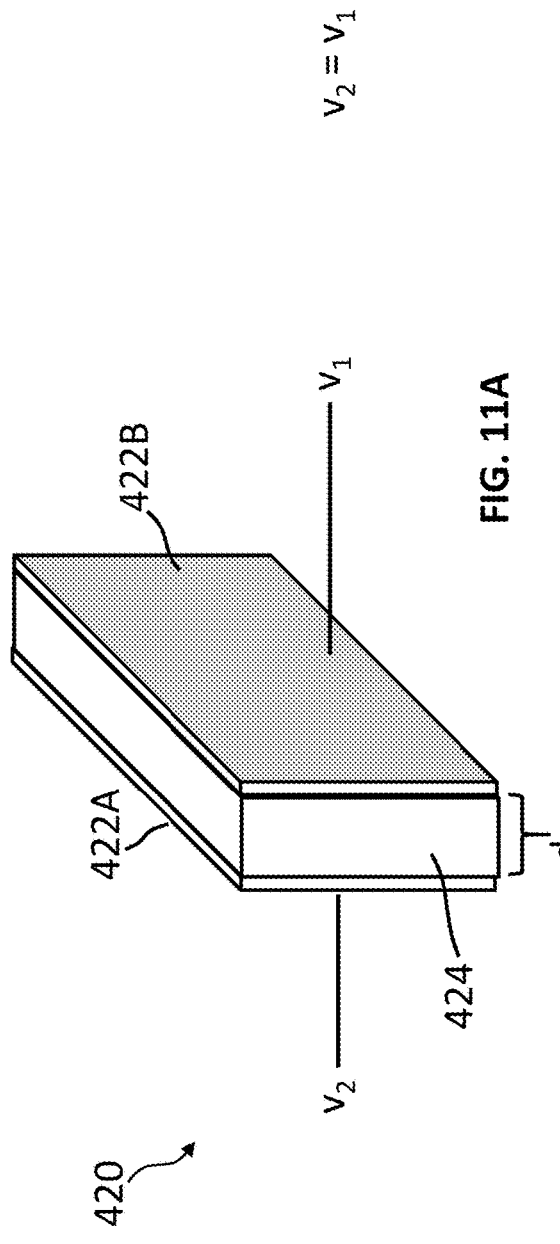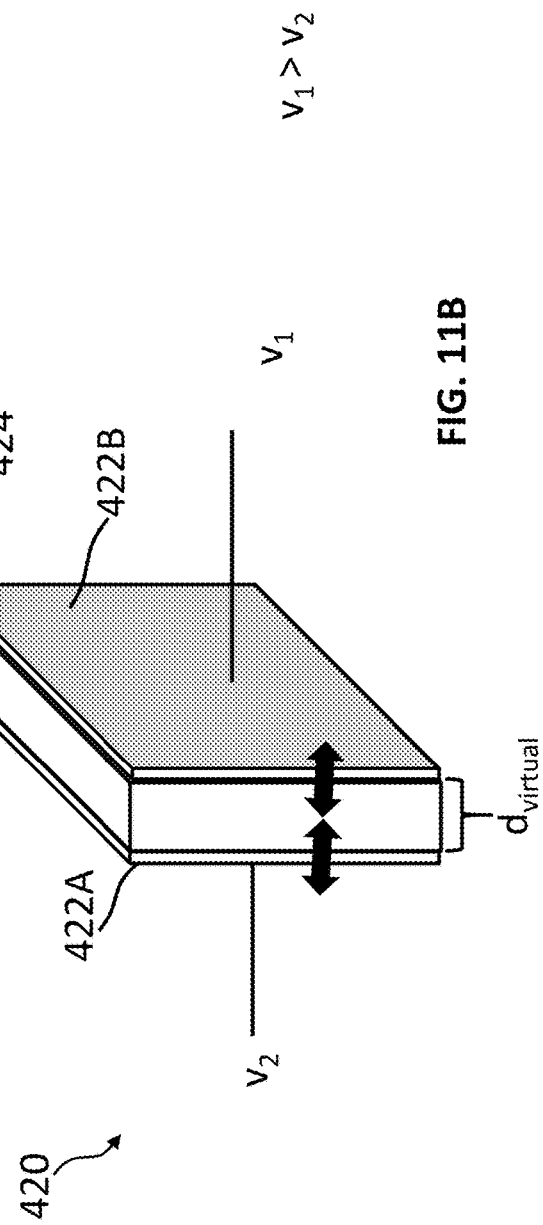

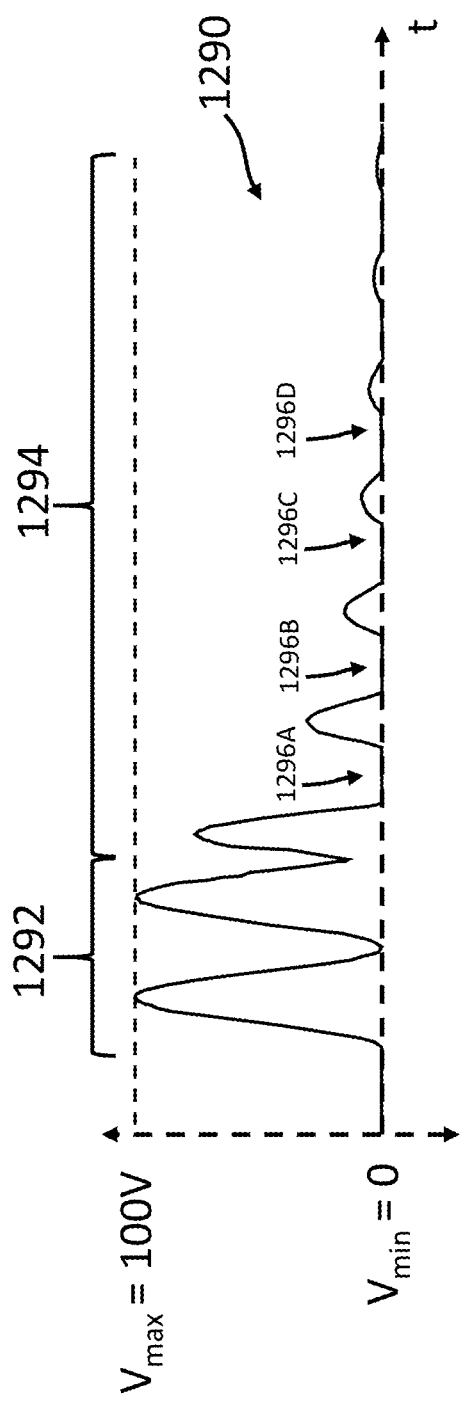
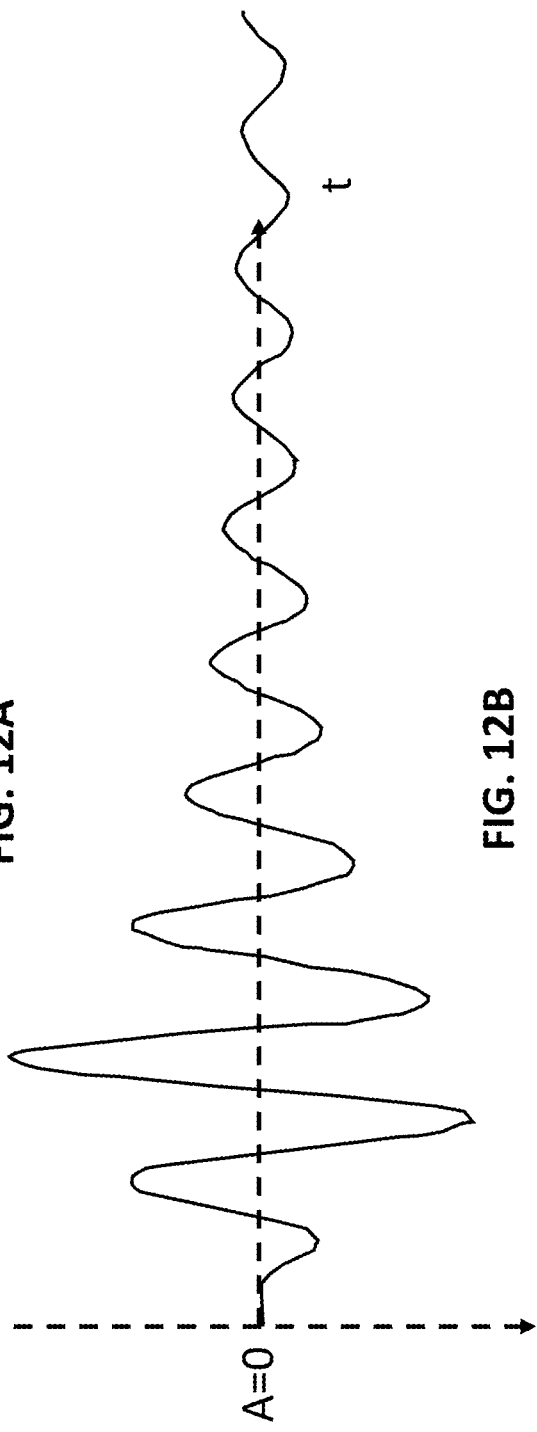
FIG. 12A
FIG. 12B

SYSTEMS AND METHODS FOR GENERATING A DRIVE SIGNAL HAVING A BRAKING PORTION

FIELD OF THE INVENTION

The present invention is directed to a system and method for controlling a haptic actuator to perform braking, and has application in automotive user interface systems, mobile computing, or any other user interface system.

BACKGROUND

As electronic user interface systems become more prevalent, the quality of the interfaces through which humans interact with these systems is becoming increasingly important. Haptic effects can improve the quality of the interfaces by providing cues to users, providing alerts of specific events, or providing realistic effects to create greater sensory immersion within a virtual environment. Examples of haptic effects include kinesthetic haptic effects (such as active and resistive force effects), vibrotactile haptic effects, and electrostatic friction haptic effects. The haptic effects may be generated by generating a drive signal and applying the drive signal to a haptic actuator.

SUMMARY

One aspect of the embodiments herein relates to a haptic-enabled system and method for controlling a haptic actuator. The haptic-enabled system comprises the haptic actuator, a movement sensor, and a control circuit. The control circuit is configured to: generate a driving portion of a drive signal; apply the driving portion of the drive signal to the haptic actuator to generate movement of one or more portions of the haptic-enabled system (e.g., movement of an actuatable portion); determine, via the movement sensor, the movement of the one or more portions of the haptic-enabled system; determine, based on the movement of the one or more portions of the haptic-enabled system, a time-varying correction signal for reducing the movement (e.g., for reducing movement of the actuatable portion); generate a braking portion of the drive signal based on a combination of the time-varying correction signal and a defined offset that is greater than a defined rated minimum signal value for the haptic actuator and less than a defined rated maximum signal value for the haptic actuator; and apply the braking portion of the drive signal to the haptic actuator.

One aspect of the embodiments herein relates to a method for controlling a haptic-enabled system. The method comprises: generating a driving portion of a unipolar drive signal or non-symmetric bipolar drive signal; applying the driving portion of the unipolar drive signal or non-symmetric bipolar drive signal to a haptic actuator of the haptic-enabled system; generating a braking portion of the unipolar drive signal or non-symmetric bipolar drive signal based on a defined offset that is greater than a defined rated minimum signal value for the haptic actuator and less than a defined rated maximum signal value for the haptic actuator; and applying the braking portion of the unipolar drive signal or non-symmetric bipolar drive signal to the haptic actuator. Numerous other aspects are provided.

Features, objects, and advantages of embodiments hereof will become apparent to those skilled in the art by reading the following detailed description where references will be made to the appended figures.

BRIEF DESCRIPTION OF THE DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIGS. 10A and 10B illustrate examples of time-varying offsets, according to an aspect hereof.

FIGS. 11A and 11B illustrate an actual equilibrium position and a virtual equilibrium position of a haptic actuator, respectively, according to aspects hereof.

FIGS. 12A and 12B illustrate an example drive signal and acceleration caused by the drive signal, according to an aspect hereof.

DETAILED DESCRIPTION

Figure 1A:
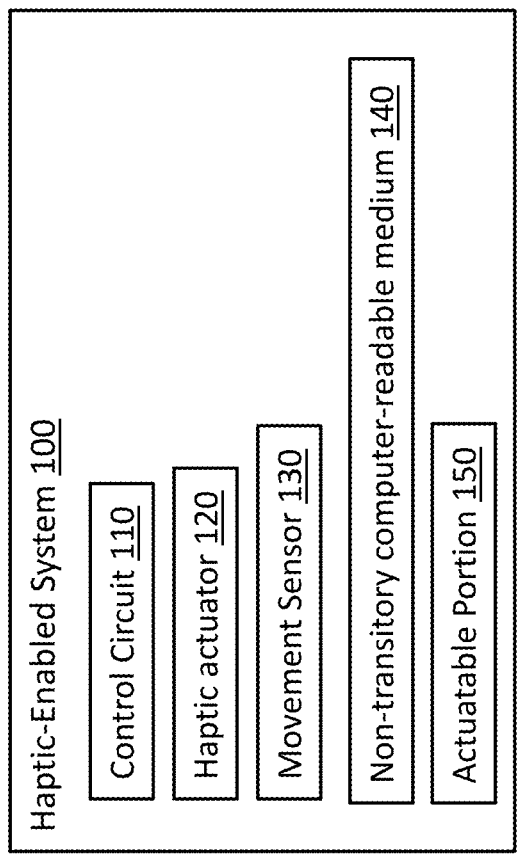
FIG. 1A provides a block diagram illustrating a haptic-enabled system for generating a haptic effect, according to an aspect hereof.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

One aspect of embodiments herein relate to generating a braking portion of a drive signal with the use of an offset. In some instances, the drive signal may have a driving portion which is applied to a haptic actuator to cause movement (e.g., vibration) for a haptic effect, while the braking portion may be applied to the haptic actuator to reduce residual movement that remains after the driving portion has ended. The residual movement may be relevant to various situations, such as when a metal structure is driven by the haptic actuator. The metal structure may have a low level of dampening, and thus may experience a high level of residual movement unless an effective braking portion is applied.

In some aspects, the braking portion may be generated by combining (e.g., adding, superimposing, modulating and/or the like) the offset to a correction signal. The correction signal may be, for example, a signal generated using closed-loop control for reducing the residual movement. The correction signal itself, however, may not be sufficiently effective in some instances, such as when the haptic actuator is an asymmetric haptic actuator, which may also be referred to as a non-symmetric haptic actuator. The non-symmetric haptic actuator may be, e.g., a haptic actuator designed to operate with only a unipolar drive signal, or with a non-symmetric bidirectional drive signal. In other words, the non-symmetric haptic actuator may have a signal domain which excludes all signal values of a particular polarity (e.g., negative polarity), or that more generally is not symmetric about a drive signal value of zero. The correction signal may have signal values are outside of the signal domain of the non-symmetric haptic actuator. For example, the correction signal may have signal values which have a polarity (e.g., negative polarity) that is outside of the signal domain. While these signal values of the correction signal may be intended to cause the non-symmetric haptic actuator to output displacement and/or force in a particular direction, these signal values may not be usable for the haptic actuator because they fall outside of the signal domain of the haptic actuator. In some cases, the non-symmetric haptic actuator may be unable to output displacement in that particular direction relative to its equilibrium position, or may be damaged if it tried to do so.

In some instances, combining the correction signal with the offset may generate a signal value for the braking portion that is more likely to be within the signal domain of the haptic actuator. For example, if the signal domain included only signal values that are greater than or equal to zero, adding the offset to the correction signal may yield a signal value that is more likely to also be greater than or equal to zero. In some cases, adding the offset to the correction signal may also establish a virtual equilibrium position. More specifically, the haptic actuator may have an actual equilibrium position associated with the haptic actuator being in a non-energized state, such as when no active drive signal has been applied to the haptic actuator, wherein an active drive signal refers to a drive signal having nonzero signal values whose magnitude exceed background noise. The virtual equilibrium may be associated with an energized state of the haptic actuator, in which a net amount of energy has been delivered to the haptic actuator. In these cases, the haptic actuator may be able to output displacement in both directions relative to the virtual equilibrium position. As a result, a braking portion which establishes this virtual equilibrium position through the use of an offset may be more effective in braking the residual movement mentioned above.

In some aspects, the offset may be a time-varying offset that decreases over time. Because the offset may act as a DC offset or DC bias that delivers a net amount of energy to the haptic actuator, the haptic actuator may accumulate energy over time, which may cause damage to the haptic actuator through overheating or other causes. Thus, the offset may be decreased over time. For instance, the offset may be decreased from an initial offset value toward a signal value at which the haptic actuator will return to a non-energized state. This signal value at which the haptic actuator returns to the non-energized state may be, e.g., a voltage value or current value of zero, or approximately zero, wherein the signal value may be approximately zero when its magnitude is equal to or less than a level of background noise. As the offset is decreased, the haptic actuator may be brought from its virtual equilibrium position toward its actual equilibrium position.

In some aspects, a smoothening function may be used to avoid a sharp discontinuity between an end of the driving portion and a beginning of the braking portion. The smoothening function may, for example, adjust initial signal values of the correction signal and/or initial offset values so as to make an initial part of the resulting braking portion closer in value to an end of the driving portion.

FIG. 1A illustrates a haptic-enabled system 100 that is configured to control a haptic actuator 120 by using an offset to generate a drive signal, or more specifically to generate a braking portion of the drive signal. In some aspects, the haptic-enabled system 100 may be a user interface system or part of a user interface system. For instance, the user interface system may be an infotainment system or part of an infotainment system disposed at a center console of a vehicle, and the haptic-enabled system 100 may be configured to generate haptic effects for the infotainment system at the center console, or at another location. In some cases, the user interface system may form a standalone device (e.g., which may be referred to as a user interface device), such as a handheld user interface device. The handheld user interface device may include, e.g., a mobile phone, tablet computer, or game controller.

As depicted in FIG. 1A, the haptic-enabled system 100 may include a control circuit 110, a haptic actuator 120, a movement sensor 130, and a non-transitory computer-readable medium 140. In some aspects, the haptic actuator 120 may be configured to output (e.g., generate) displacement and/or a force in response to a drive signal (e.g., voltage signal or electrical current signal) being applied to the haptic actuator 120. A nonzero drive signal value may deliver energy to the haptic actuator 120, so as to drive the haptic actuator 120 from a non-energized state to an energized state. In some aspects, the haptic actuator 120 may return to the non-energized state, immediately or gradually, when no active drive signal value is applied to the haptic actuator 120 (e.g., when a drive signal value of zero is applied to the haptic actuator 120). In some instances, the haptic actuator 120 may have a signal domain that is asymmetric (also referred to as an asymmetric or non-symmetric signal domain). For example, the haptic actuator 120 in those instances may be a smart material actuator, such as a piezoelectric actuator or an electroactive polymer (EAP) actuator, or may be a solenoid actuator. In some instances, the haptic actuator 120 may have a signal domain that is symmetric (also referred to as a symmetric signal domain). For example, the haptic actuator 120 in such instances may be a linear resonant actuator (LRA). Asymmetric and symmetric signal domains are discussed below in more detail.

In some aspects, the force and/or displacement from the haptic actuator 120 may generate movement (e.g., vibration) of one or more portions of the haptic-enabled system 100, or more generally of one or more portions that are associated with the haptic-enabled system 100. Each of the one or more portions for which movement is generated by the haptic actuator 120 may be referred to as, e.g., an actuatable portion, actuatable component, or actuatable structure. For instance, FIG. 1A depicts an actuatable portion 150 that may experience movement as a result of force and/or displacement exerted by the haptic actuator 120 on the actuatable portion 150. In some aspects, the actuatable portion 150 may be a structure that is actuated by the force and/or displacement of the haptic actuator 120 to output a haptic effect. In some cases, the actuatable portion 150 may be mechanically coupled to the haptic actuator 120. For instance, the force and/or displacement generated by the haptic actuator 120 may cause the actuatable portion 150 to vibrate. In some cases, the actuatable portion may include a user input device (e.g., a display device, or more specifically a touch screen device) and/or a mounting structure (e.g., suspension structure) used to mount the user input device, as discussed below in more detail. In some cases, the actuatable portion 150 may include a metal structure formed at least partially from metal, which may enhance a durability of the actuatable portion 150 for an automotive environment or some other environment. If the actuatable portion 150 includes a user input device, the user input device may in some instances include one or more of the control circuit 110, haptic actuator 120, movement sensor 130, and/or non-transitory computer-readable medium 140 embedded within the user input device. In some aspects, the actuatable portion 150 may be part of the haptic-enabled system 100, as depicted in FIG. 1A. In other aspects, the actuatable portion 150 may be separate from the haptic-enabled system 100. For instance, the actuatable portion 150 in such aspects may be a component that is in contact with the haptic-enabled system 100.

In some aspects, the control circuit 110 may be in communication with the haptic actuator 120, and may be configured to generate a drive signal for driving the haptic actuator 120. In some instances, the control circuit 110 may include an amplifier, or more generally a drive circuit, that is configured to generate a level of voltage or electrical current for the drive signal. In some aspects, the control circuit 120 may include one or more processors or processor cores, a programmable logic array (PLA) or programmable logic circuit (PLC), a field programmable gate array (FPGA), an application specific integrated circuit (ASIC), a microcontroller, or any other control circuit. If the control circuit 120 includes a processor, the processor may be a general purpose processor (e.g., a general purpose processor configured to operate an infotainment system of a vehicle, or a general purpose processor on a mobile phone or tablet computer), or may be a processor dedicated to generating haptic effects. In some aspects, the control circuit 110 may be configured to control the haptic actuator 120 based on data from the movement sensor 130, as discussed below in more detail.

In some aspects, the movement sensor 130 may be configured to measure or otherwise sense movement, displacement, speed, acceleration, or some other characteristic of movement of the one or more portions of the haptic-enabled system 100 (e.g., movement of the actuatable portion 150). In some cases, the movement that is measured by the movement sensor 130 may include a residual movement, which may be movement that is caused by a driving portion of a drive signal and that remains after an end of the driving portion of the drive signal. The movement sensor 130 may be, e.g., mechanically coupled to the one or more portions of the haptic-enabled system (e.g., actuatable portion 150) and/or to the haptic actuator 120. In one example, the movement sensor 130 may be a position sensor (e.g., a potentiometer) that is configured to sense displacement of the one or more portions of the haptic-enabled system 100 (e.g., of the actuatable portion 150). In one example, the movement sensor 130 may be an acceleration sensor 130 (also referred to as an accelerometer) configured to sense acceleration of the one or more portions of the haptic-enabled system (e.g., of the actuatable portion 150). For instance, the movement sensor 130 may be or may include a spring-mass-based acceleration sensor, a piezoelectric-based accelerometer sensor, a micro-machined micro-electrical-mechanical (MEMS) acceleration sensor, or any other type of acceleration sensor.

In an embodiment, the non-transitory computer-readable medium 140 may store instructions that can be executed by the control circuit 110, store information that describes the haptic actuator 120, and/or store information that describes haptic effects (e.g., a parameter value of a haptic parameter, or a waveform). The non-transitory computer-readable medium 140 may include, e.g., a dynamic random access memory (DRAM), a solid state drive (SSD), a hard disk drive (HDD), a tape drive, or any other storage device.

Figure 1B:
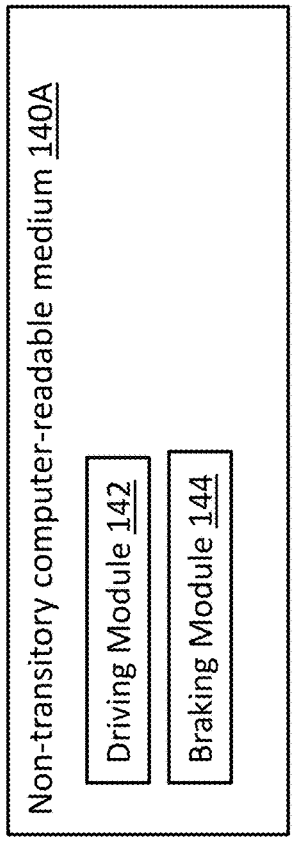
FIGS. 1B and 1C provide a block diagram illustrating modules for generating a haptic effect, according to aspects hereof.

As stated above, the control circuit 110 may be configured to generate a drive signal for driving the haptic actuator 120. In some aspects, generating a drive signal for the haptic actuator 120 may involve generating a driving portion of the drive signal and generating a braking portion of the drive signal. The driving portion of the drive signal may be intended to create or generate movement for a haptic effect, while the braking portion of the drive signal may be intended to stop any residual movement, so as stop the haptic effect. As stated above, the residual movement may be movement which was created by the driving portion, and which remains after an end of the driving portion. That is, the residual movement remains after the driving portion has stopped. FIG. 1B illustrates an example having a non-transitory computer-readable medium 140A storing a driving module 142 and a braking module 144. The non-transitory computer-readable medium 140A may be an embodiment of the non-transitory computer-readable medium 140. The driving module 142 and braking module 142 may each be, e.g., a function, library, or more generally a set of instructions, that can be executed by the control circuit 110. In some aspects, the control circuit 110 may execute the driving module 142 to generate the driving portion of the drive signal, and may execute the braking module 144 to generate the braking portion of the drive signal. In such an example, the control circuit 110 may initially execute the driving module 142, and then switch to executing the braking module 144. In some aspects, the control circuit 110 may be configured to apply a smoothening function that reduces and/or prevents any sharp discontinuity between an end of the driving portion and a beginning of the braking portion, as discussed below in more detail.

Figure 1C:
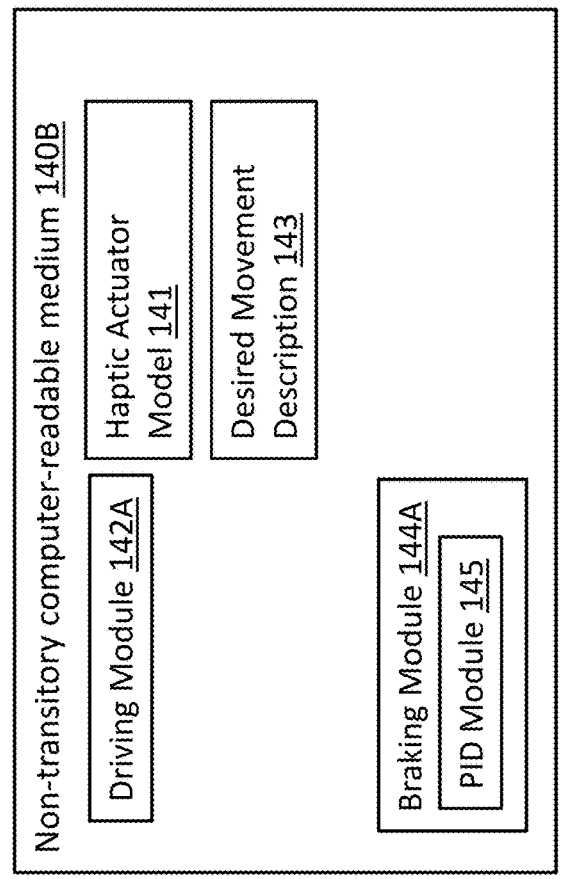

In some aspects, the control circuit 110 may be configured to generate the driving portion of the drive signal based on information which describes the haptic actuator 120, such as a haptic actuator model 141 illustrated in FIG. 1C. More specifically, FIG. 1C depicts a non-transitory computer-readable medium 140B (which may be an embodiment of the non-transitory computer-readable medium 140A) storing a driving module 142A, the haptic actuator model 141, and desired movement description 143. In some aspects, the driving module 142A may be an embodiment of the driving module 142, and the control circuit 110 may execute the driving module 142A to generate the driving portion of the drive signal based on the haptic actuator model 141 and/or the desired movement description 143.

In some aspects, the desired movement description 143 may be a description of desired movement for one or more haptic effects. For example, if the desired movement refers to desired acceleration for a haptic effect, the description 143 may include a reference acceleration profile that describes a desired acceleration waveform for the haptic effect. The desired movement description 143 may additionally or alternatively include a parameter value of a haptic parameter. For instance, if the desired movement involves an oscillatory movement (e.g., a vibration), the haptic parameter may indicate a number of peaks in the oscillatory movement, peak-to-peak acceleration or velocity of the oscillatory movement, and/or a frequency of the movement.

In some aspects, the haptic actuator model 141 may be a model that describes, e.g., transient behavior of the haptic actuator 120. In some instances, the model may include a value that describes a mechanical transient characteristic or electrical transient characteristic of the haptic actuator 120. In some instances, the haptic actuator model 141 may include an inverse transfer function that relates desired movement for a haptic effect to drive signal values. For example, if the desired movement involves a desired acceleration waveform (e.g., $a_{desired}(t)$), the inverse transfer function may be configured to convert the desired acceleration waveform a drive signal (e.g., d(t)), or more specifically to drive signal values. Haptic actuator models are discussed in more detail in U.S. patent application Ser. No. 16/250,494, titled "METHOD AND DEVICE FOR PERFORMING ACTUATOR CONTROL BASED ON AN ACTUATOR MODEL," filed on Jan. 17, 2019, the entire content of which is incorporated herein by reference.

In some aspects, the control circuit 110 may generate a driving portion of a drive signal (e.g., when executing the driving module 142 and/or driving module 142A) in a completely open-loop manner (e.g., also referred to as a feed forward manner) based on the haptic actuator model 141, or in a hybrid manner that combines open-loop control and closed-loop control. Such a hybrid manner of control may generate an initial driving portion based on the haptic actuator model 141, and then adjust the initial driving portion based on, e.g., measurement by the movement sensor 130, so as to generate an adjusted driving portion of the drive signal for the haptic actuator 120. Generating a driving portion of a drive signal is discussed in more detail in U.S. patent application Ser. No. 16/250,494, and in U.S. patent application Ser. No. 16/581,992, titled "DEVICES AND METHODS FOR CONTROLLING A HAPTIC ACTUATOR," filed on Sep. 25, 2019, the entire contents of which are incorporated herein by reference.

In some aspects, the control circuit 110 may be configured to generate the braking portion of the drive signal based on closed-loop control. In some instances, as discussed below in more detail, the control circuit 110 may be configured to generate a correction signal for reducing movement of one or more portions of the haptic-enabled system 100, such as reducing movement of the actuatable portion 150 (e.g., residual movement of the actuatable portion 150), and generate the braking portion based on the correction signal. The control circuit 110 may generate the correction signal when, e.g., the driving portion has ended or is about to end. In some cases, the closed-loop control may be used to generate the correction signal. For instance, the closed-loop control may involve proportional-integral-derivative (PID) control. FIG. 1C illustrates a braking module 144A, which may be an embodiment of the braking module 144, that has a PID module 145 configured to generate the correction signal based on the PID control. In one example, the correction signal may be intended for reducing residual movement of, e.g., the actuatable portion 150 after the end of the driving portion, so as to return the actuatable portion toward a rest state. The rest state may refer to, e.g., a velocity and/or acceleration of one or more portions of the haptic-enabled system, for example, the actuatable portion 150 being at zero. In some aspects, the PID control may involve generating the correction signal based on a difference between the residual movement of the actuatable portion 150 and the rest state. For instance, the PID control may be based on a proportion of that difference, a derivative of that difference, and/or an integral of that difference (e.g., a multiple of the integral of that difference), as discussed below in more detail. In some cases, the PID control may be based on a measurement from the movement sensor 130 indicative of the residual movement.

Figure 1D:
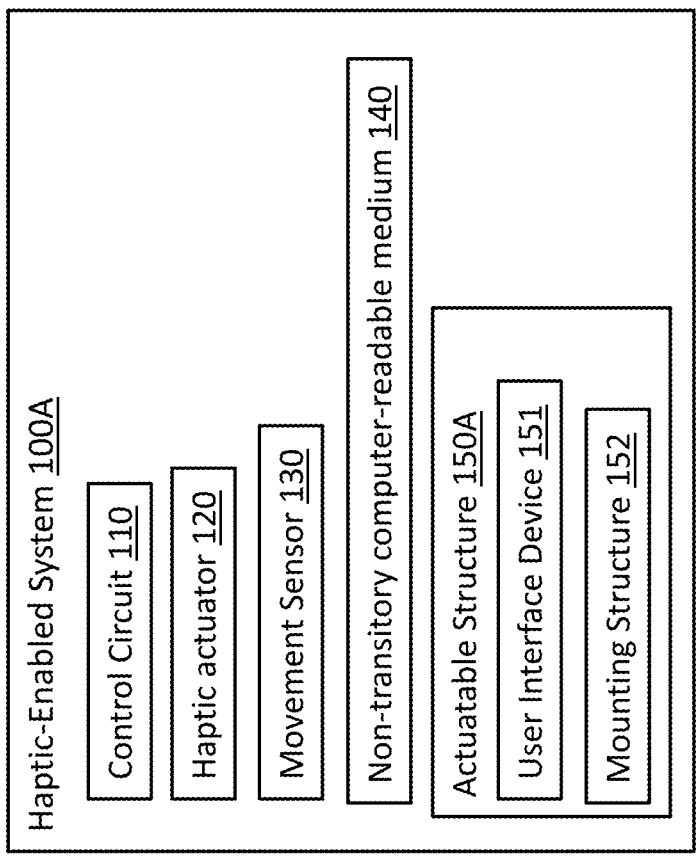
FIG. 1D provides a block diagram illustrating a haptic-enabled system for generating a haptic effect, according to an aspect hereof.

As stated above, the actuatable portion 150 in some aspects may include a user input device and/or a mounting structure. FIG. 1D illustrates a haptic-enabled system 100A in which an actuatable portion 150A includes a user interface device 151 and a mounting structure 152. The haptic-enabled system 100A and the actuatable portion 150A may be embodiments of the haptic-enabled system 100 and the actuatable portion 150, respectively. In some aspects, the user input device 151 may be a touch input device, such as a touchpad or a touch screen device. In some aspects, the mounting structure 152 may be a structure which mounts the user input device 151 to its environment, such as a center console or dashboard of a vehicle. In some cases, the mounting structure 152 may include or form a suspension (e.g., also referred to as suspension structure) for the user interface device 151.

In some aspects, the mounting structure 152 may form one or more flexure structures (e.g., also referred to as flexures), such as one or more metal flexure structures. Each of the one or more flexure structures may be configured to undergo elastic deformation, such as bending (e.g., also referred to as flexing), as a result of forces generated by the haptic actuator 120. In some cases, the movement of the actuatable portion 150 may include the bending or other elastic deformation of the flexure structures, and may be measured by the movement sensor 130 of FIG. 1A.

Figure 2:
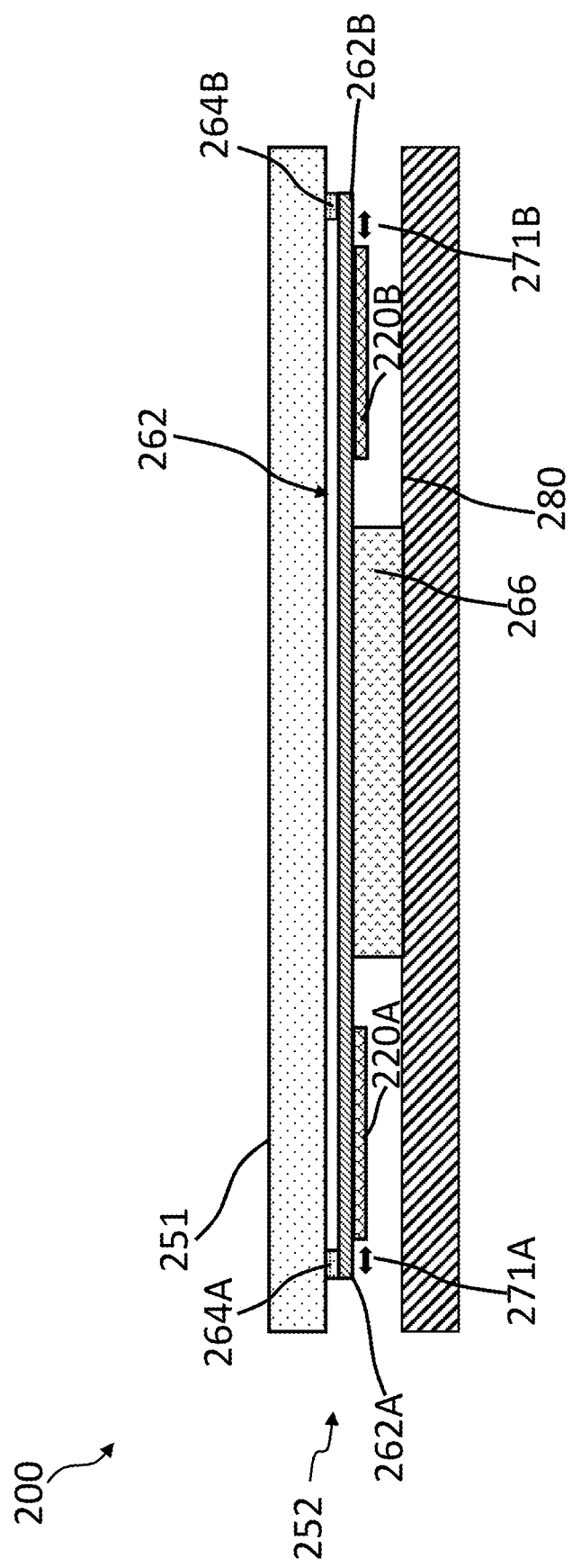
FIGS. 2 and 3 illustrate examples of actuatable portions of haptic-enabled systems, according to aspects hereof.

FIG. 2 depicts an example haptic-enabled system 200 that includes a user input device 251 (e.g., touch screen device) and a mounting structure 252. The haptic-enabled system 200 may be an embodiment of the haptic-enabled system 100/100A, while the user interface device 251 and mounting structure 252 may be embodiments of the user interface device 151 and the mounting structure 152, respectively, of FIG. 1D as well as an embodiment of the actuatable portion 150 of FIG. 1A. The haptic-enabled system 200 further includes a first haptic actuator 220A and a second haptic actuator 220B, both of which may be an embodiment of the haptic actuator 220. In some instances, the first haptic actuator 220A and the second haptic actuator 220B may be coupled to and/or in direct contact with the first beam 262A and the second beam 262B, respectively.

In some aspects, the mounting structure 252 may form a suspension structure for suspending the user interface device 251 over a center console, or some other location. In the example of FIG. 2, the mounting structure 252 includes a layer 262 of material that forms one or more beams, such as a first beam 262A and a second beam 262B. In some instances, the layer 262 may be formed from an elastomeric material. In some instances, the layer 262 may be a metal sheet, such that the first beam 262A and the second beam 262 may each be a metal beam (e.g., a steel beam). Each of the first beam 262A and the second beam 262B may be, e.g., elastically deformable, and form part of the suspension structure for the user input device 251. As depicted in FIG. 2, the mounting structure 252 further includes one or more spacers 264A, 264B that separate the user input device 251 and the layer 262 of material. In some aspects, the layer 262 may be attached to a mounting support 266, which may be attached to a mounting surface 280, such as a surface in a vehicle, or some other surface. The mounting support 266 and the mounting surface 280 may be part of the haptic-enabled system 200, or may be considered separate from the haptic-enabled system 200.

In some aspects, each of the first beam 262A and second beam 262B may form a flexure structure that bends or otherwise flexes when a force from the haptic actuator 220A/220B is exerted on the beam. If the flexure structure is made of metal, it may be referred to as a metal flexure. The metal flexure may provide more durability over another material, such as a plastic or elastomeric material.

In some aspects, each of the first haptic actuator 220A and the second haptic actuator 220B may be configured to output displacement, which may generate a force. The displacement may include, e.g., deformation that causes a dimension of the haptic actuator 220A/220B to change. For instance, the haptic actuator 220A and 220B may each shrink along an axis indicated by the arrows 271A and 271B in response to a respective drive signal. As the first haptic actuator 220A or second haptic actuator 220B shrinks, it may exert a force (e.g., downward force) on the first beam 262A or 262B, respectively, that causes the beam to bend downward, which may in turn pull on the user input device 251. In some cases, the haptic actuator 262A and/or 262B may be controlled to cause the beam 262A and/or 262B to repeatedly bend and relax, which may create a vibration in the beam 262A and/or 262B. The vibration may form a haptic effect for, e.g., simulating a button click on the user input device 251.

Figure 3:
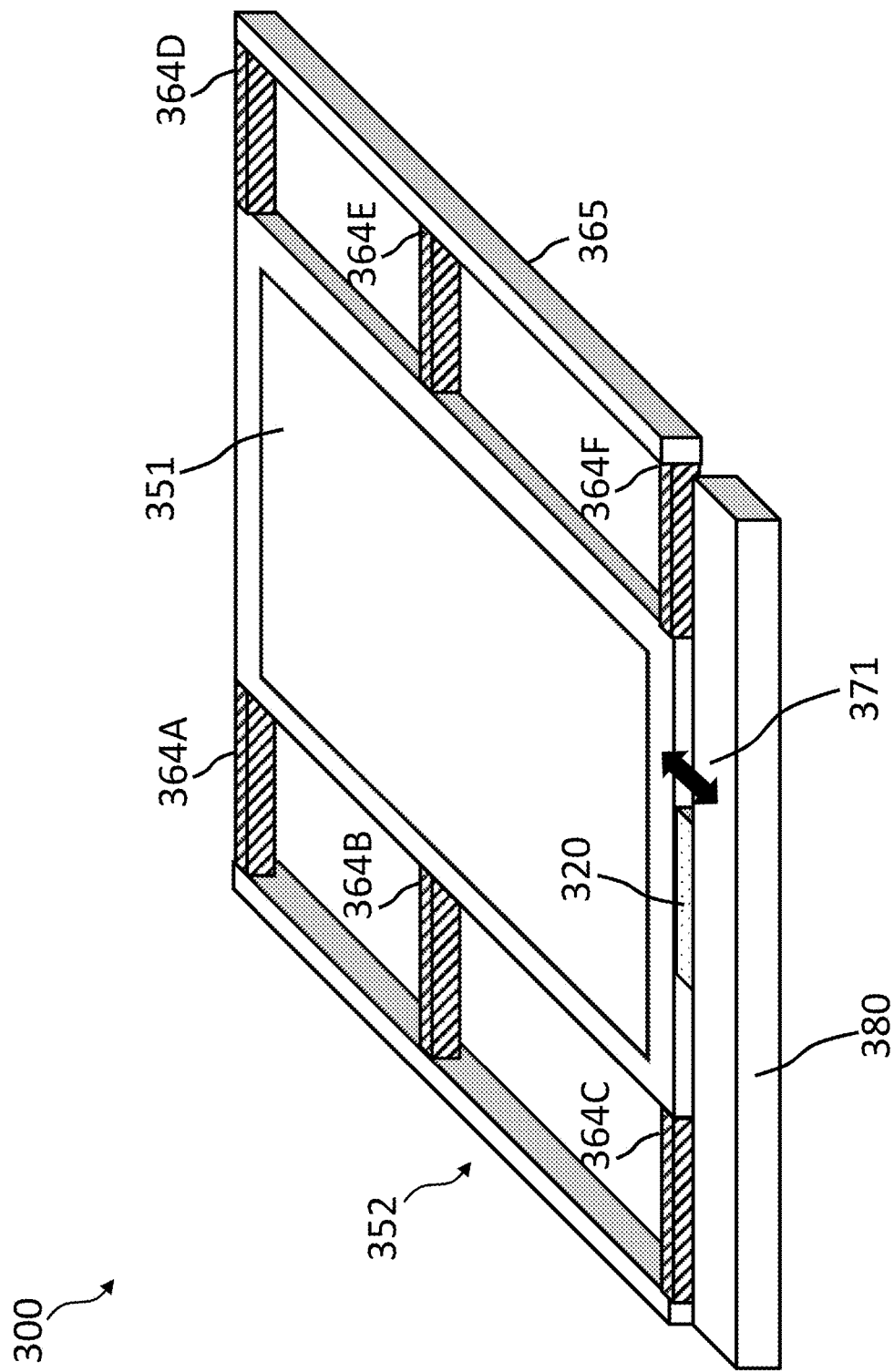

FIG. 3 depicts an example haptic-enabled system 300 that includes a user input device 351 (e.g., touch screen device) and a mounting structure 352. The haptic-enabled system 300 may be an embodiment of the haptic-enabled system 100/100A, while the user interface device 351 and mounting structure 352 may be embodiments of the user input device 151 and the mounting structure 152, respectively, of FIG. 1D. The haptic-enabled system 300 further includes a haptic actuator 320, which may be an embodiment of the haptic actuator 120. The haptic actuator 320 may be disposed between the user input device 351 and a mounting support 380. The mounting support may be considered part of the haptic-enabled system 300, or may be considered separate from the haptic-enabled system 300.

In some aspects, the mounting structure 352 may include a plurality of beams 364A-364F. Each of the plurality of beams 364A-364F may, e.g., be deformable and form a flexure between a frame 365 and the user input device 351. In some cases, each of the plurality of beams 364A-364F may be a metal beam that forms a metal flexure. In some aspects, the haptic actuator 320 may be configured to generate a force that causes movement (e.g., vibration) of the user input device 351 and/or of one or more of the beams 364A-364F. For example, the haptic actuator 320 may generate the force by outputting displacement. In this example, the displacement may involve the haptic actuator 320 deforming, or more specifically shrinking, along an axis indicated by the arrow 371. This displacement may exert a pulling force on the user input device 351, which may also cause the flexures formed by the beams 364A-364F to bend.

Figure 4:
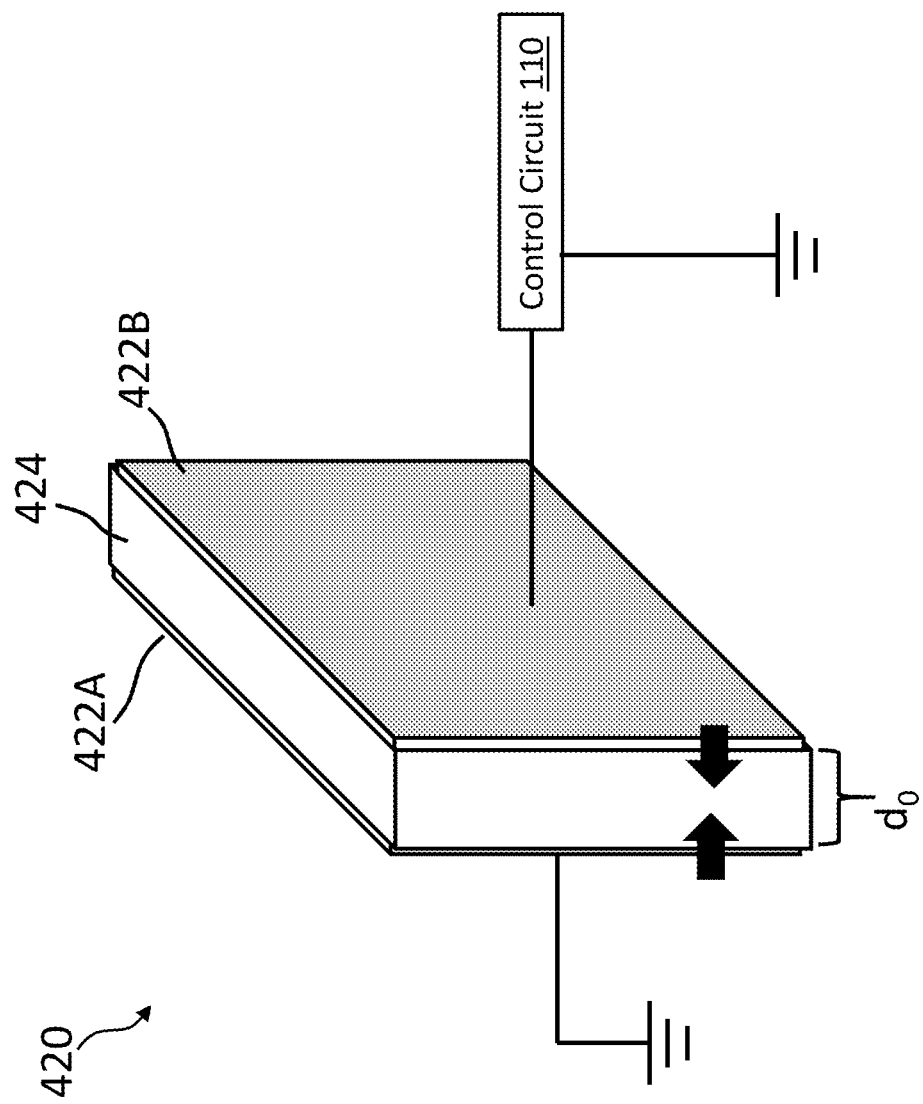
FIG. 4 illustrates an example haptic actuator, according to an aspect hereof.

As stated above, the haptic actuator 120 of FIG. 1A may be configured to generate a force in response to a drive signal. In some cases, the haptic actuator 120 may be a solenoid actuator. In some cases, the haptic actuator 120 may a piezoelectric actuator, an electroactive polymer (EAP) actuator, or some other smart material actuator. For instance, FIG. 4 depicts a haptic actuator 420, which may be an embodiment of the haptic actuator 120. The haptic actuator 420 may be a piezoelectric actuator or an electroactive polymer (EAP) actuator that includes a layer 424 of excitable material that is, e.g., piezoelectric material (e.g., a piezoceramic material such as lead zirconate titanate, or PZT) or electroactive polymer (EAP) material. The layer 424 of excitable material may be material that is configured to generate a force in response to a difference in electrical potential or a change in that difference of electrical potential (e.g., a voltage difference or change in voltage difference) between opposite sides of the layer. As illustrated in FIG. 4, the haptic actuator 420 may include the layer 424 of excitable material and at least a pair of electrodes, or more specifically a first electrode 422A and a second electrode 422B, disposed on opposite sides of the layer 424.

In some aspects, the haptic actuator 420 may output displacement in response to a drive signal, wherein the displacement may generate a force. In some cases, the haptic actuator 420 may be a unidirectional haptic actuator that is able to output displacement in only one direction relative to an equilibrium position. The equilibrium position may be, e.g., a position of the haptic actuator when no active drive signal is being applied, and/or may be, e.g., a position of the haptic actuator 420 when the haptic actuator 420 is in a non-energized state. For instance, if the control circuit 110 in FIG. 4 is not applying any active drive signal to the haptic actuator 420, the haptic actuator 420 may be in an equilibrium position and a non-energized state. The active drive signal may refer to a drive signal that has nonzero drive signal values whose magnitude exceed a level of background noise. Thus, when the haptic actuator 420 in this example is applied with a drive signal value of zero or with drive signal values whose magnitude are less than or equal to the level of background noise, the haptic actuator 420 may return to the equilibrium position and/or to the non-energized state. When the haptic actuator is at the equilibrium position and/or at the non-energized state, the layer 424 may have a thickness of, e.g., do. In some cases, the haptic actuator 420 may be able to output displacement in an inward direction, by causing the thickness of the layer 424 to decrease relative to do. However, the haptic actuator may not be designed to output displacement in an outward direction past its equilibrium its equilibrium position. More specifically, the haptic actuator 420 may be unable to cause the layer 424 to increase its thickness beyond do, or may damage the layer 424 in attempting to do so. Thus, in some aspects, a unidirectional haptic actuator may be designed to receive a unipolar drive signal, or a non-symmetric bi-directional drive signal which causes the unidirectional haptic actuator to output displacement only in one direction, or primarily in one direction. More generally speaking, the unidirectional haptic actuator may have a non-symmetric signal domain.

Figure 5:
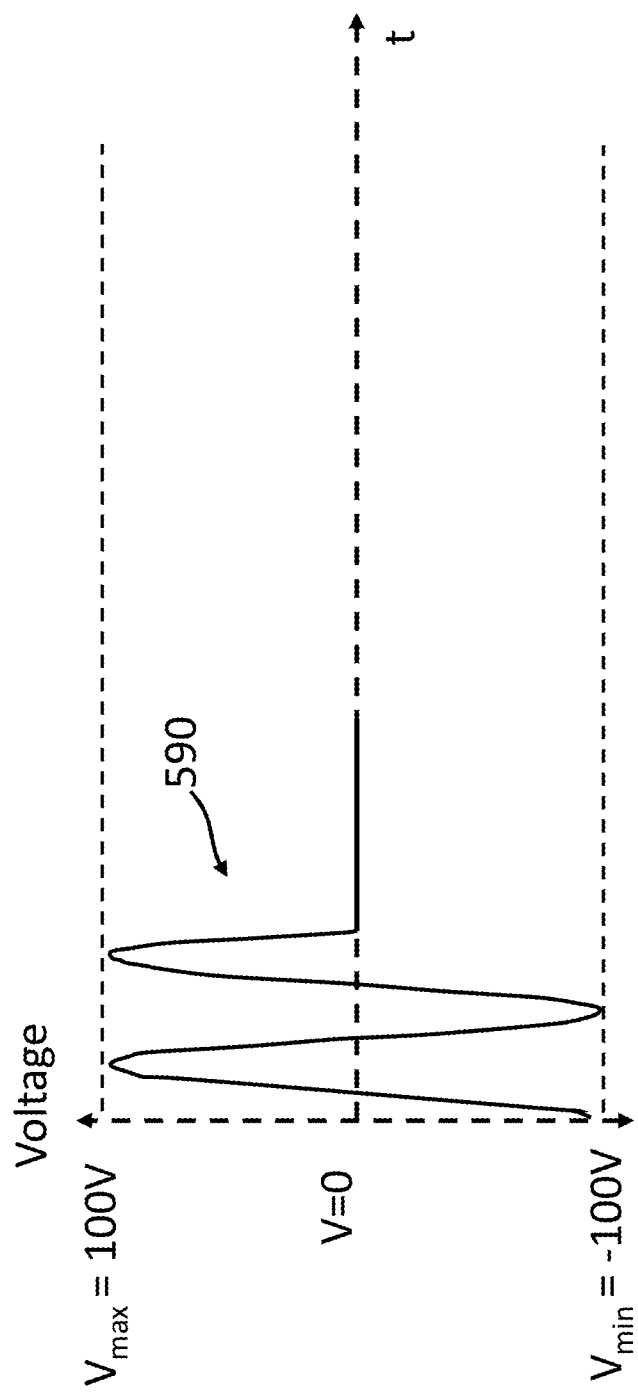
FIG. 5 illustrates an example drive signal, according to an aspect hereof.

As stated above, the haptic actuator 120 (or, more specifically of haptic actuator 220A/220B/320/420) may have a symmetric signal domain or an asymmetric signal domain. In some aspects, the signal domain may refer to a set of all possible drive signal values (e.g., voltage values or electrical current values) that will effectively drive the haptic actuator 120 without damaging the haptic actuator 120. Drive signal values which fall outside of the signal domain of the haptic actuator 120 may cause damage to the haptic actuator 120 and/or be ineffective in driving the haptic actuator 120, or more generally may cause undesirable behavior from the haptic actuator 120. In some cases, the signal domain may be a range that is between a rated minimum signal value (e.g., −100 V, or 0 V) and a rated maximum signal value (e.g., 100 V). For example, FIG. 5 depicts a drive signal 590 in a signal domain for, e.g., a LRA actuator, wherein the signal domain is a range between a minimum signal value of −100 V and a maximum signal value of 100 V. In such cases, the haptic actuator 120 may be rated to be driven within this range, or more generally to operate within this range. Drive signal values which are within this range may effectively and sustainably operate the haptic actuator 120, while signal values which are outside of this range may be ineffective in operating the haptic actuator 120 and/or may cause damage to the haptic actuator 120, either immediately or over a short period of time.

In some aspects, the signal domain may be predefined (e.g., by a manufacturer of the haptic actuator 120) or may be defined dynamically (e.g., estimated) by the control circuit 110. In such aspects, the signal domain may be referred to as a defined signal domain. In some instances, the defined signal domain may be a defined range that is between a defined rated minimum signal value and a defined rated maximum signal value, wherein the defined rated minimum signal value and/or the defined rated maximum signal value may be a value predefined by the manufacturer of the haptic actuator 120 and stored on the non-transitory computer-readable medium 140, or a value that is defined dynamically. In such instances, the defined signal domain may include all signal values that are within the range (e.g., between the defined rated minimum signal value and the defined rated maximum signal value), and may exclude all signal values that are outside of the defined range.

In some aspects, the signal domain of the haptic actuator 120 may be a symmetric signal domain. The symmetric signal domain may be a signal domain that is symmetric about a drive signal value of zero. The symmetric sub-domain may be divided into a first sub-domain of signal values of a first polarity (e.g., positive polarity), a second sub-domain of signal values of a second and opposite polarity (e.g., negative polarity), and a signal value of zero, wherein the first sub-domain and the second sub-domain have the same size. Further, the symmetric signal domain may be a range that is from a defined rated minimum signal value to a defined rated maximum value, wherein the defined rated minimum signal value and the defined rated maximum value may be equal in magnitude. For example, FIG. 5 provides an example of a symmetric signal domain which has a first sub-domain of positive signal values which are less than or equal to 100 V, and a second sub-domain of negative signal values which are greater than or equal to −100 V. In this example, both the first sub-domain and the second sub-domain have a size of 100 V. Stated differently, the symmetric signal domain of FIG. 5 may be a range that extends from a defined rated minimum signal value of −100 V to a defined rated maximum signal value of 100 V, wherein the defined rated minimum signal value and the defined rated maximum signal value both have the same magnitude of 100 V. The symmetric signal domain allows a symmetric bipolar drive signal, such as the drive signal 590, to be applied to the haptic actuator 120. In some instances, the haptic actuator 120 may exhibit symmetric behavior when drive signal values of opposite polarity from a symmetric bipolar drive signal are applied to the haptic actuator. In such instances, the haptic actuator 120 may be referred to as a bipolar or bidirectional haptic actuator, such as a LRA. For example, if the haptic actuator 120 is a bipolar haptic actuator, it may output respective displacements or forces of the same magnitude or approximately the same magnitude, but in opposite directions, in response to respective drive signal values that have the same magnitude but are opposite in polarity.

Figure 6A:
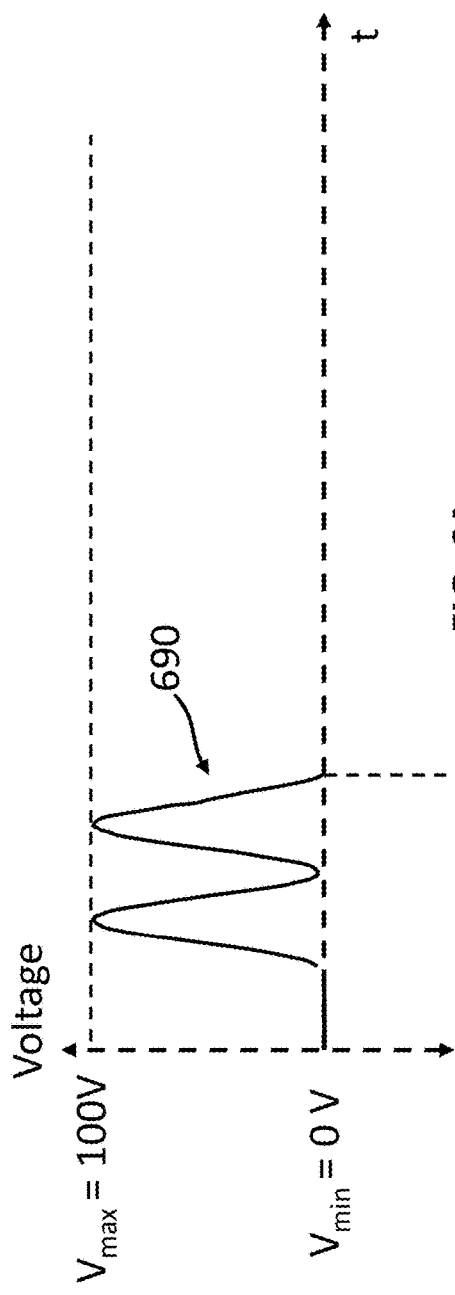
FIGS. 6A and 6B illustrate an example drive signal and acceleration caused by the drive signal, according to an aspect hereof.

As stated above, the haptic actuator 120 may in some aspects have a defined signal domain that is asymmetric, which may be referred to as an asymmetric or non-symmetric signal domain. In such cases, the haptic actuator may be referred to as an asymmetric haptic actuator. The asymmetric signal domain may be asymmetric about the drive signal value of zero. In other words, an average signal value of such an asymmetric signal domain is not equal to zero. In some cases, the asymmetric signal domain may be a range that is between a defined rated minimum signal value and a defined rated maximum signal value, wherein a magnitude (e.g., also referred to as absolute value) of the defined rated minimum value is different than a magnitude of the defined rated maximum value. For example, FIG. 6A depicts an asymmetric signal domain that is a range between a defined rated minimum value of 0 V and a defined rated maximum value of 100 V, wherein a magnitude of the defined rated minimum value (0 V) is different than a magnitude of the defined rated maximum value (100 V).

In some aspects, the non-symmetric signal domain may limit a drive signal to being a unipolar drive signal or a non-symmetric bipolar drive signal. For instance, the unipolar drive signal may exclude drive signal values of a certain polarity (e.g., negative polarity). In some cases, the non-symmetric bipolar drive signal may be a signal in which a maximum signal value of the signal and a minimum signal value of the signal are different in magnitude.

In some cases, the asymmetric signal domain may be divided into a first sub-domain that has only signal values of a first polarity (e.g., positive polarity), a second sub-domain that has only signal values of a second polarity (e.g., a negative polarity), and a drive signal value of zero, but the first sub-domain and the second sub-domain are not equal in size. For instance, the asymmetric signal domain may be a range that extends from a defined rated minimum signal value (e.g., a negative value of, e.g., −30 V) to a defined rated maximum signal value that (e.g., a positive value of, e.g., 100 V). In this example, the first sub-domain has a size of 100 V, while is the second sub-domain has a size of 30 V.

In some cases, the asymmetric signal domain may include only signal values that are greater than or equal to zero, or only signal values that are less than or equal to zero. If the haptic actuator 120 has such a signal domain, it may be referred to as a unipolar actuator. As an example, FIG. 6A depicts an asymmetric signal domain having only signal values that are greater than or equal to zero, and that exclude signal values of a negative polarity. In some aspects, if the signal domain of the haptic actuator 120 excludes all signal values of a particular polarity (e.g., negative polarity), the haptic actuator 120 may be limited to outputting displacement or force in only one direction relative to an equilibrium position. In such aspects, the haptic actuator 120 may be referred to as a unidirectional haptic actuator. For example, the unidirectional haptic actuator may be the haptic actuator 420 of FIG. 4, which may be a piezoelectric actuator or EAP actuator. Some types of piezoelectric actuators may be configured to output displacement in a first direction relative to an equilibrium position when drive signal values of a positive polarity are applied, and may be damaged if drive signal values of a negative polarity are applied. In such an example, the piezoelectric actuator or other unidirectional haptic actuator may have to receive only unipolar drive signals, such as the drive signal 690 of FIG. 6A. If the unidirectional haptic actuator receives a bipolar drive signal, such as the drive signal 590 of FIG. 5, the unidirectional haptic actuator may be damaged, or may barely respond or fail to respond to signal values of a particular polarity (e.g., fail to respond to signal values that are negative).

Figure 6B:
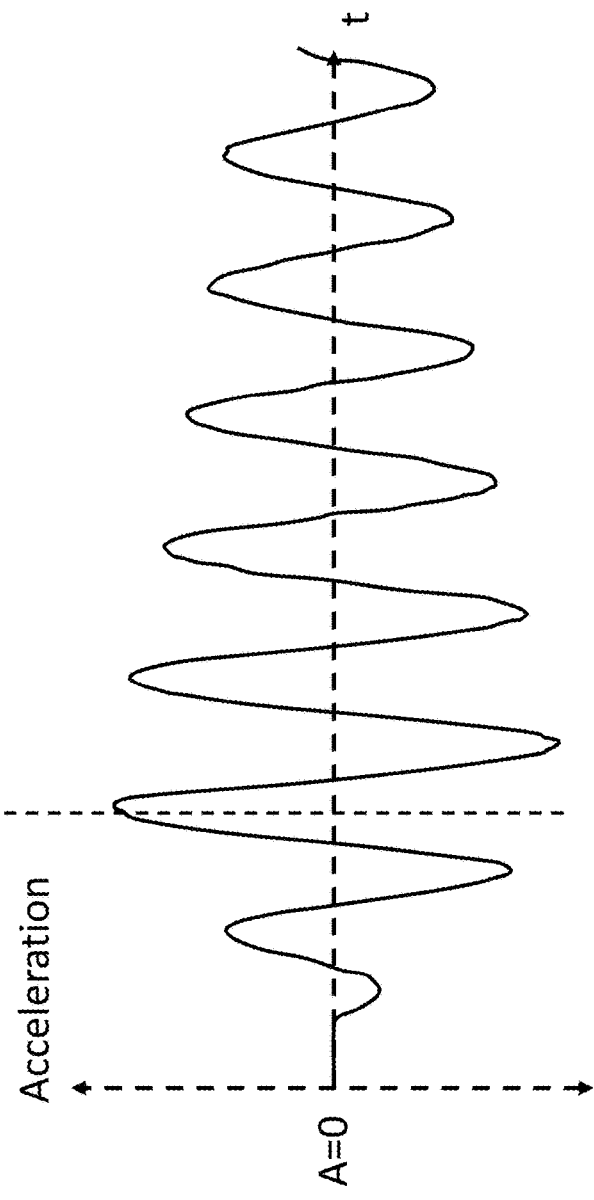

As stated above, when a drive signal, such as the drive signal 690, is applied to the haptic actuator 120, the haptic actuator 120 may output force or displacement to cause a vibration or other movement of one or more portions of the haptic-enabled system 100, such as movement of the actuatable portion 150 of FIG. 1A. In some aspects, the one or more portions (e.g., actuatable portion 150) may experience residual movement even after the haptic actuator 120 has stopped outputting a force. If the residual movement is an oscillatory movement such as a vibration, it may be referred to as tail oscillation, and may result from inertia that is not sufficiently dampened. For instance, the actuatable portion 150 may include a metal flexure or other metal structure. The metal structure provides high durability for the actuatable portion 150, but the metallic material may have a low level of damping, which may cause a long tail oscillation. As an example, FIG. 6B depicts acceleration of a metal flexure, such as the flexure structure illustrated in FIGS. 2 and 3, as a result of applying the drive signal 690 to the haptic actuator 120, which may be a unidirectional haptic actuator in this example. As the figure depicts, the metal flexure may exhibit tail oscillation that lasts a considerable amount of time (e.g., 80 msec) after an end of the drive signal 690. Such tail oscillation may be undesirable, especially when a sharp haptic effect is intended.

As stated above, a drive signal may include a braking portion that attempts to reduce movement associated with the drive portion such as movement of the actuatable portion 150 (e.g., residual movement of the actuatable portion 150), so as to reduce the tail oscillation. For instance, the control circuit 110 may execute the braking module 144/144A to generate a correction signal based on closed-loop control (e.g., also referred to as closed-loop feedback control), such as PID control. In some implementations, the braking portion of the drive signal may be equal to the correction signal or a clipped version of the correction signal (as discussed below), and may be applied to the haptic actuator 120 to attempt to counteract, for example, the residual movement of the actuatable portion 150. As an example, FIG. 7A illustrates a drive signal 790 which has a driving portion 792 and a braking portion 794, wherein the braking portion 794 may be generated based on a correction signal, but may be generated without the use of an offset.

Figure 7A:
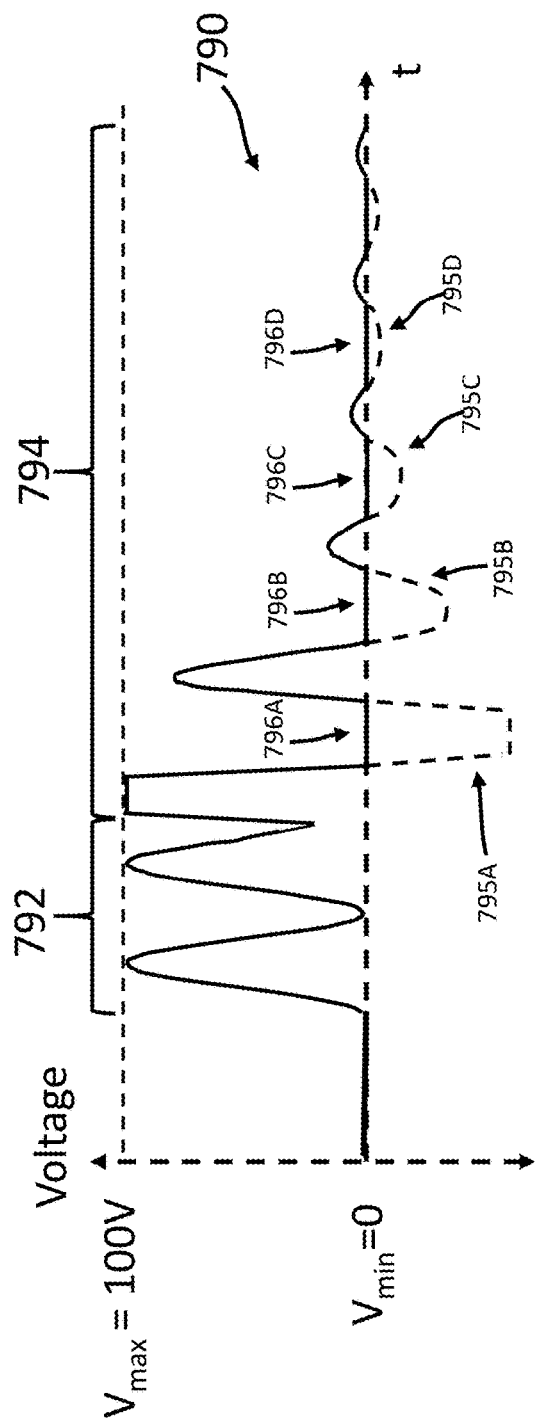
FIGS. 7A and 7B illustrate an example drive signal and acceleration caused by the drive signal, according to an aspect hereof.

In some aspects, the effectiveness of the braking portion 794 in FIG. 7A may be limited when it is generated for a haptic actuator 120 that has an asymmetric signal domain, or more specifically when the haptic actuator 120 is a unipolar or unidirectional haptic actuator such as a piezoelectric actuator. The effectiveness of the braking portion for a haptic actuator with an asymmetric signal domain may be limited because, e.g., its signal values can only have a first polarity (e.g., a positive polarity) or be at zero, and cannot have a second and opposite polarity (e.g., a negative polarity) or cannot be as strong in the second and opposite polarity. In the example of FIG. 7A, the signal values of braking portion 794 have to be between 0 V and 100 V, and cannot be negative. In another example, the signal values of a braking portion for a haptic actuator with an asymmetric signal domain may have to be between −30 V and 100 V.

Figure 7B:
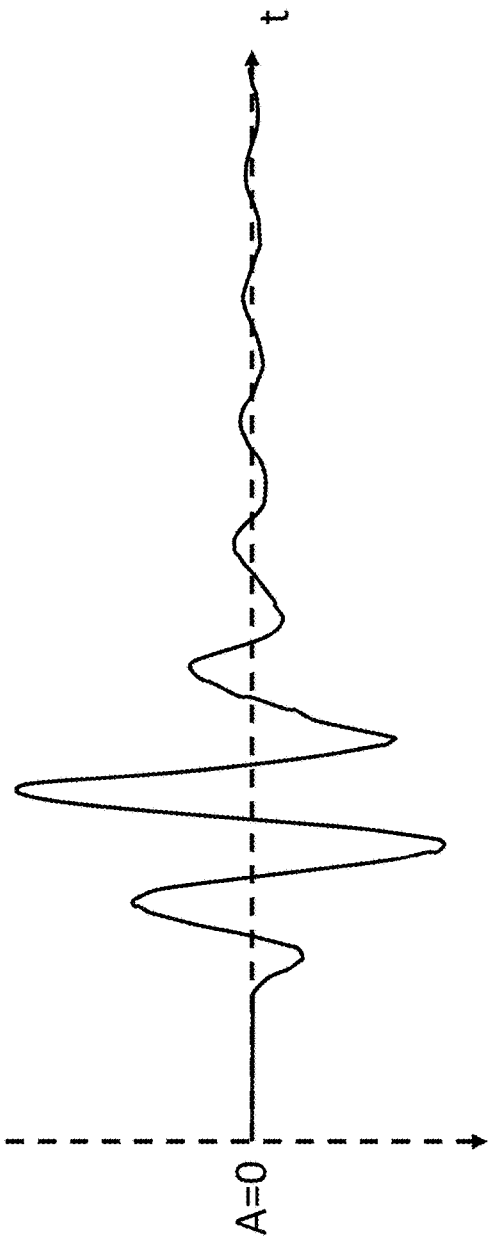

In the example of FIG. 7A, the braking portion 794 may be a clipped version of a correction signal. For instance, the correction signal may be generated based on PID control, as discussed above, but is constrained to a defined rated minimum signal value of 0 V and a defined rated maximum signal value of 100 V. In this example, when the correction signal is within this range (e.g., when the corrections signal has a positive polarity), the braking portion 794 may be equal to the correction signal. When these signal values are applied to the haptic actuator 120, they may cause the haptic actuator 120 to output displacement in a first direction relative to the actuator's equilibrium position, which may generate a force in the first direction to counteract the movement, for example, the residual movement of one or more portions of the haptic-enabled system (e.g., residual movement of the actuatable portion 150). However, as FIG. 7A illustrates, the braking portion 794 may further include several periods 796A, 796B, 796C, 796D of zero signal value. The periods 796A, 796B, 796C, 796D may correspond to the correction signal being clipped at zero. More specifically, FIG. 7A further depicts portions 795A, 795B, 795C, and 795D of the correction signal having negative signal values. These portions 795A, 795B, 795C, and 795D may be generated by, e.g., a PID module in an attempt to generate a force in a second and opposite direction to also counteract the residual movement of the actuatable portion. However, the negative signal values of such portions 795A, 795B, 795C, and 795D may cause the haptic actuator 120 to attempt to output displacement in the second direction relative to its equilibrium position. The haptic actuator 120 may be unable to output the displacement in the second direction, or may be damaged in doing so. Thus, the correction signal may be clipped at the defined rated minimum value of zero, and may exclude the portions 795A-795D. In other examples, the defined rated minimum signal value may be a negative value, but may have a smaller magnitude relative to the defined rated maximum signal value, so that any displacement by the haptic actuator 120 in the second direction relative to its equilibrium position will be limited. Thus, the braking portion in these examples may be unable to cause the haptic actuator 120 to output a force in the second direction, or to at most apply a weak force in the second direction. As a result, even though a unidirectional haptic actuator such as a piezoelectric actuator may exhibit good frequency response, the effectiveness of the braking portion 794 in counteracting the residual movement of the actuatable portion 150 may be limited. For example, FIG. 7B depicts acceleration of the actuatable portion 150. As the figure illustrates, the actuatable portion 150 exhibits residual movement, or more specifically residual acceleration, after the driving portion 792 has stopped. Although the braking portion 794 is applied to reduce the residual acceleration, it still continues for several cycles after the braking portion 794 is applied.

As stated above, one aspect of the embodiments herein relates to using an offset to generate a braking portion of a drive signal. In some instances, the offset may cause the haptic actuator 120 to have or form a displacement or an average displacement relative to its equilibrium position. This average displacement may define or be treated as a virtual equilibrium position, which is discussed below in more detail. When a signal value of the braking portion is higher than the offset, the haptic actuator 120 may output a displacement in a first direction relative to the virtual equilibrium position, and the haptic actuator may generate a force in the first direction to counteract residual movement of one or more portions of the haptic-enabled system 100 (e.g., residual movement of the actuatable portion 150). When a signal value of the braking portion is less than the offset, the haptic actuator 120 may output a displacement in a second direction relative to the virtual equilibrium position. By allowing the haptic actuator to operate around this virtual equilibrium position, rather than its actual equilibrium position, the haptic actuator 120 may be able to output displacement in both directions relative to the virtual equilibrium position, and thus may be able to output a force in both directions (e.g., both an inward direction and an outward direction, or both a pushing direction and a pulling direction). As a result, the haptic actuator may be able to generate both a force in a first direction and a force in a second and opposite direction, which may allow the haptic actuator 120 to more effectively counteract movement, for example, residual movement of the one or more portions of the haptic-enabled system 100 (e.g., counteract movement of the actuatable portion 150) and to reduce and/or stop the movement, for example, to return the one or more portions (e.g., the actuatable portion 150) to a rest state.

Figure 8:
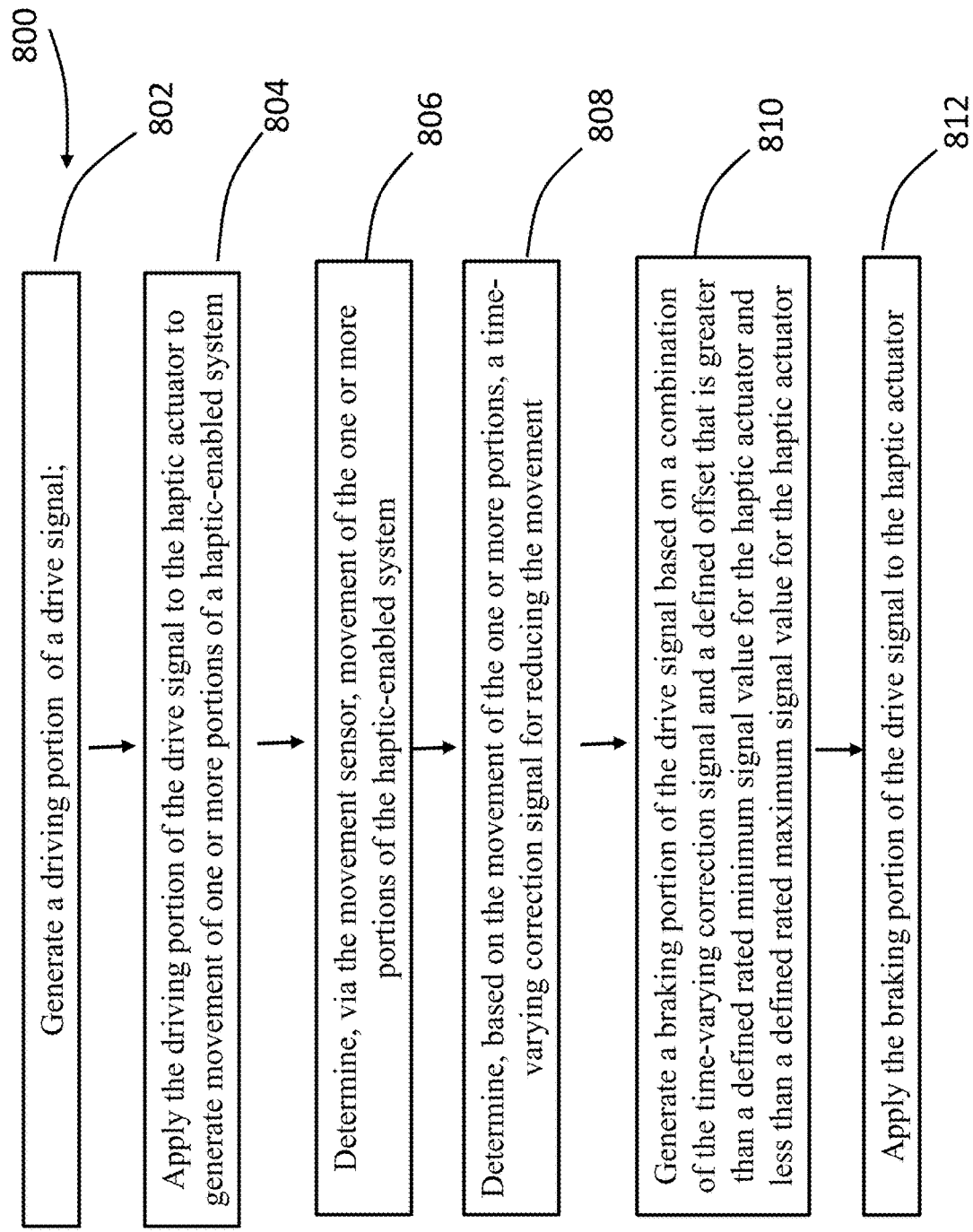
FIG. 8 provides a flow diagram that illustrates an example method for controlling a haptic actuator to generate a braking portion of a drive signal, according to an aspect hereof.

FIG. 8 depicts an example method 800 for generating a braking portion with the use of an offset. In an aspect, the steps of method 800 may be performed by the control circuit 110, or more generally by the haptic-enabled system 100 (e.g., by the haptic-enabled system 100A, 200, 300, 400). In some cases, the control circuit 110 may execute instructions stored on the non-transitory computer-readable medium 140 to perform these steps.

Figure 9A:
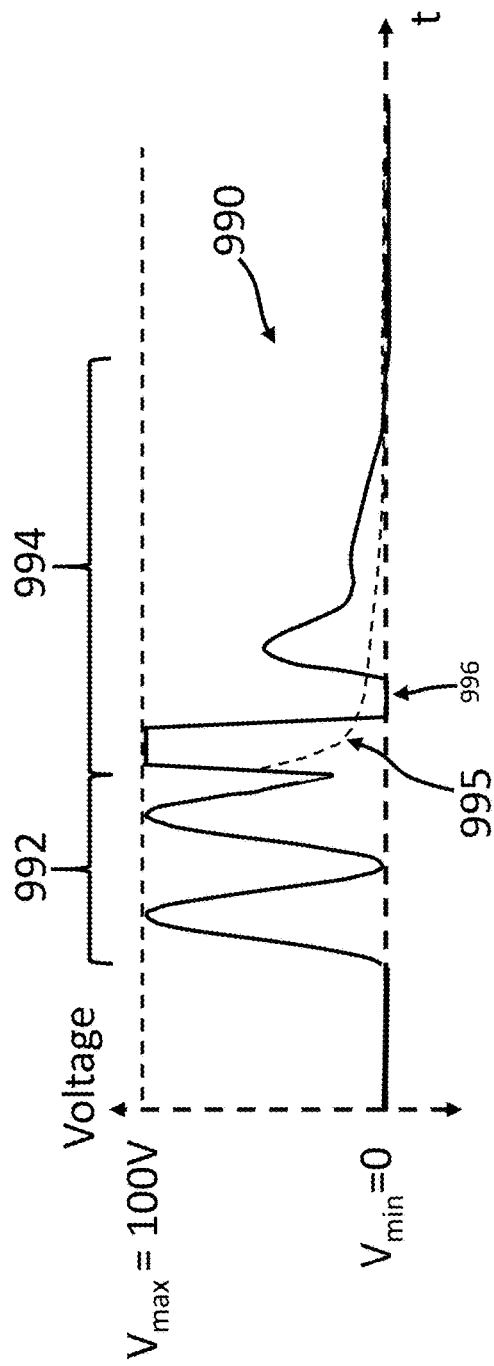
FIGS. 9A and 9B illustrate an example drive signal and acceleration caused by the drive signal, according to an aspect hereof.

In an aspect, the method 800 may begin at step 802, in which the control circuit 110 may generate a driving portion of a drive signal. In some aspects, the haptic actuator 120 may be in a non-energized state before step 802 is performed. For instance, step 802 may immediately follow a period in which no active drive signal has been applied to the haptic actuator 120. In some aspects, the control circuit 110 may perform step 802 in response to a determination to generate a haptic effect, such as a haptic effect to simulate a button click. FIG. 9A depicts an example of a driving portion 992 of a drive signal 990 generated by step 802. In some cases, the control circuit 110 may execute the driving module 142/142A to generate the driving portion of the drive signal. As stated above, the control circuit 110 may in some examples generate the driving portion in an open-loop manner, based on a model of the haptic actuator 120 (e.g., haptic actuator 141) and/or based on a stored description (e.g., 143) of desired movement for the haptic effect. This description may include, e.g., a time-dependent waveform that describes the desired movement (e.g., desired acceleration) and/or a parameter value of a haptic parameter, such as a total number of peaks, a maximum peak-to-peak amplitude, a frequency content of the acceleration, and/or a duration or number of cycles of the haptic effect. The driving portion may have any shape, such as a sinusoidal shape (as illustrated in FIG. 9A) or a square shape.

In some aspects, as stated above, the driving portion may be generated for an asymmetric signal domain. For instance, FIG. 9A illustrates the driving portion 992 being constrained to the range of $V_{min}$=0 to $V_{max}$=100 V of an asymmetric signal domain. In such aspects, the haptic actuator 120 for which the driving portion is generated may be, e.g., a unidirectional actuator such as a piezoelectric actuator, solenoid, or EAP actuator. In some cases, the drive signal (e.g., 990) may be a unipolar drive signal or an asymmetric bipolar drive signal (e.g., which is asymmetric, also referred to as being non-symmetric, relative to a drive value of zero).

In step 804, the control circuit 110 applies the driving portion of the drive signal to the haptic actuator 120. More specifically, the control circuit may apply signal values (e.g., also referred to as sample values) of the driving portion to the haptic actuator 120. In some cases, the control circuit 110 may include an amplifying circuit that are configured to provide sufficient voltage and/or current for a magnitude of the signal values.

Figure 9B:
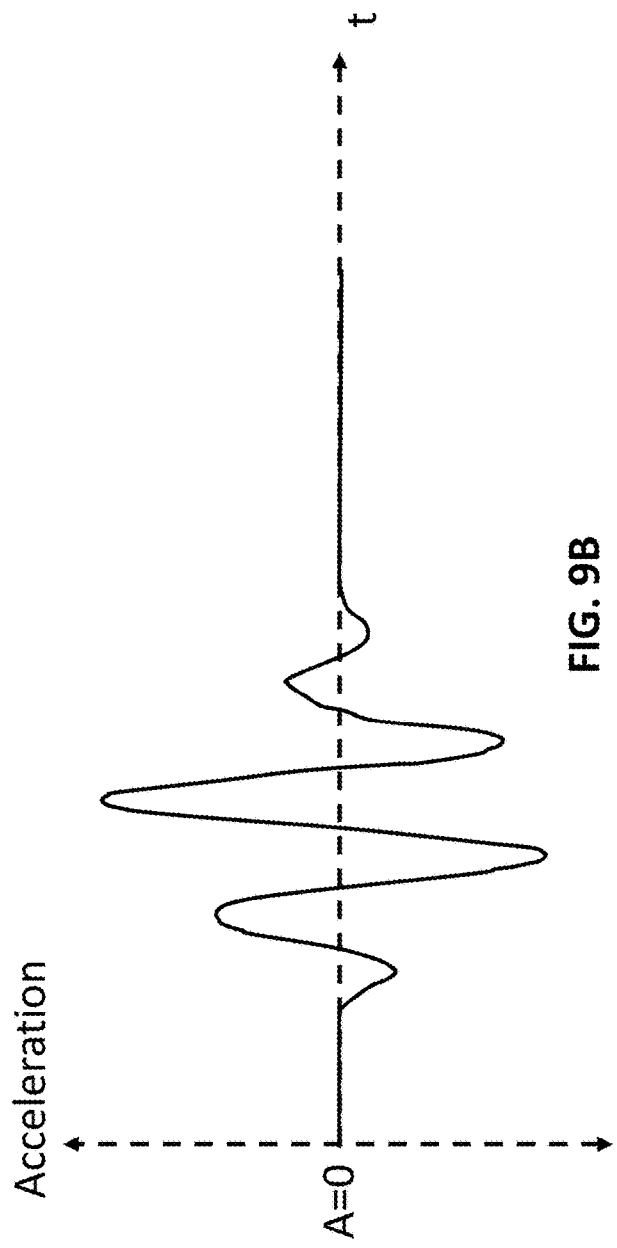

As stated above, when the driving portion is applied to the haptic actuator 120, it may cause the haptic actuator 120 to output displacement and/or force. The displacement and/or force from the haptic actuator 120 may generate or otherwise cause movement of one or more portions of or associated with the haptic-enabled system 100A. The one or more portions may include, e.g., the actuatable portion 150, which may in turn include at least one of the user input device 251/351 or the mounting structure 252/352 (e.g., suspension structure). The one or more portions may in some instances be coupled to the haptic actuator 120. FIG. 9B depicts acceleration of the one or more portions (e.g., actuatable portion 150) when the driving portion 992 is applied to the haptic actuator 120. The movement may create a haptic effect, such as a vibrotactile haptic effect (e.g., also referred to as a vibration) and/or the like at the one or more portions of the haptic-enabled system 100 (e.g., at the actuatable portion 150). In some cases, the one or more portions of the haptic-enabled system may include at least a suspension structure, and the movement of the one or more portions may be a vibration of the suspension structure.

In step 806, the control circuit determines (e.g., measures), via the movement sensor 130, the movement of the one or more portions of or associated with the haptic-enabled system 100A (e.g., of the actuatable portion 150). The movement that is measured may include at least residual movement of the one or more portions of or associated with the haptic-enabled system 100A (e.g., of the actuatable portion 150), which may be movement that is caused by the driving portion of the drive signal and that remains after an end of the driving portion. For instance, the movement sensor may be an accelerometer configured to measure tail acceleration (e.g., tail oscillation) exhibited by the one or more portions of or associated with the haptic-enabled system 100A, for example, the actuatable portion 150. In some cases, step 806 may be performed while a braking portion of the drive signal (as discussed below) is applied to the haptic actuator 120, and may also have been performed while the driving portion was applied to the haptic actuator 120. In some cases, step 806 may be performed only at or after an end of the driving portion. In some aspects, the movement may be measured over time, and the measured movement may be a waveform that include measured values for that movement sampled at different instances in time. For example, the movement sensor may be an acceleration sensor, and the movement that is measured in step 806 may be acceleration output by the haptic actuator 120 over time. In some aspects, the control circuit 110 may be configured to process measured values from the measurement sensor 130 so as to derive one or more parameter values of the movement of the one or more portions (e.g., of the actuatable portion 150). For example, the control circuit 110 may be configured to integrate measured acceleration values from the measurement sensor 130 so as to derive or otherwise determine velocity of the one or more portions of or associated with the haptic-enabled system 100A (e.g., of the actuatable portion 150). The measured values from the measurement sensor may be referred to as feedback associated with movement caused by the haptic actuator 120.

In step 808, the control circuit 110 determines, based on the movement of the one or more portions of or associated with the haptic-enabled system 100A (e.g., the movement of the actuatable portion 150), a time-varying (e.g., a time-dependent) correction signal for reducing the movement (e.g., for reducing movement of the actuatable portion 150). In some aspects, step 808 may be performed after the driving portion of the drive signal has been generated.

In some aspects, the control circuit 110 may determine the time-varying (e.g., time-dependent) correction signal based on closed-loop control, such as by executing the PID module 145 of FIG. 1C. The closed-loop control, or more specifically the PID control, may be based on a difference between measured movement (e.g., measured acceleration or velocity) of the actuatable portion 150 and a rest state of the actuatable portion 150. The rest state may be represented by, e.g., an acceleration of zero and/or velocity of zero. In such instances, the difference between the measured movement and the rest state may simply be equal to the measured movement. In some aspects, a value of the correction signal may be based on the movement of the actuatable portion 150, a time-dependent derivative of that movement, and/or a time-dependent integral of the movement. More specifically, a value of the correction signal at a time $t=t_1$, e.g., $c(t_1)$, may be based on a sum of two or more of: $k_1*m(t=t_1)$, $k_2*dm(t=t_1)/dt$, and $k_3*\int_0^{t_1}m(t)dt$, wherein m(t) refers to movement (e.g., acceleration a(t) or velocity v(t)) of the actuatable portion 150, and $k_1$, $k_2$, and $k_3$ are constant values (e.g., also referred to as gains). For instance, the correction signal may be generated based on a combination (e.g., a sum) of: (i) a multiple of the acceleration of the actuatable portion (e.g., $k_1*a(t_1)$) and (ii) an integral of the acceleration (e.g., $(k_3*\int_0^{t_1}a(t)dt)$). In some aspects, step 808 may involve multiplying the above sum by a time-based decay function, such as $e^{-kt}$, so that the correction signal is more likely to decrease over time. This time-based decay function may be specific to the correction signal of step 808, and may be separate from any decay of a time-varying offset (discussed below with respect to step 810). In some cases, if step 808 involves the time-based decay function, and step 810 involves a time-varying offset that also decays (e.g., decreases) over time, they may decay at different rates. For instance, a rate of decay for the time-based decay function for the correction signal of step 808 may be at least twice as slow as a rate of decay for the time-varying offset of step 810.

In some cases, the correction signal may be a bipolar signal that has both positive signal values and negative signal values. In some instances, at least some of the negative signal values of the correction signal may be less than a defined rated minimum signal value for the haptic actuator 120. In some implementations, the control circuit 110 in step 808 may allow the correction signal to have any signal value. In some implementations, the control circuit in step 808 may allow the correction signal to have any signal value that is within a symmetric signal domain, wherein the symmetric signal domain for the correction signal may be, e.g., a range of values that is symmetric about a voltage value or current value of zero.

In step 810, the control circuit 110 generates a braking portion of the drive signal based on a combination of the time-varying (e.g., a time-dependent) correction signal and a defined offset that is greater than a defined rated minimum signal value for the haptic actuator 120 and is less than a defined rated maximum signal value for the haptic actuator 120. For instance, FIG. 9A depicts a braking portion 994 of the drive signal 990, and depicts an offset 995 that is greater than the defined rated minimum signal value $V_{min}$ of 0 V and is less than a defined rated maximum signal value $V_{max}$ of 100 V. In some aspects, the combination may be a sum of the time-varying correction signal and the defined offset, superposition of the time-varying correction signal on the defined offset and/or modulation of the time-varying correction signal and the defined offset. That is, the control circuit 110 may be configured to determine the combination of the time-varying correction signal and the defined offset by adding signal values of the time-varying correction signal to the defined offset. In some aspects, the offset may act as a DC offset, DC bias, or more generally a large signal component of the braking portion, while the correction signal may act as a small signal component of the braking portion. In some aspects, the control circuit 110 may be configured to generate the braking portion by applying clipping at the defined rated maximum value $V_{max}$ to the combination of the time-varying correction signal and the defined offset. For instance, the control circuit 110 may determine, for each value of the combination of the time-varying correction signal and the defined offset, whether the value exceeds the defined rated maximum signal value for the haptic actuator 120. If the value does not exceed the defined rated maximum signal value, the control circuit 120 may set a corresponding part of the braking portion to be equal to this value. If the value exceeds the defined rated maximum signal value, the control circuit 120 may set the corresponding part of the braking portion to be equal to the defined rated maximum signal value.

In some aspects, adding the correction signal to an offset may prevent the correction signal from being clipped at a defined rated minimum signal value $V_{min}$, or may reduce how often the correction signal is clipped at $V_{min}$. More specifically, the correction signal may have signal values that are less than $V_{min}$. When one of these signal values is added to a corresponding offset value, the resulting combination (e.g., sum) may more likely be equal to or greater than $V_{min}$. For example, FIG. 7A depicts a braking portion 794 that is based on a correction signal and that does not include an offset. The braking portion 794 has several periods 796A, 796B, 796C, and 796D at which it is clipped at $V_{min}$. By contrast, the braking portion 994 in FIG. 9A does include an offset, and has only a single period 996 at which it is clipped at $V_{min}$. In some aspects, the value of the correction signal may decrease over time as the actuatable portion 150 gets closer to a resting state. The decrease of the correction signal over time may also decrease a combination (e.g., sum) of the correction signal and the offset, and thus decrease the likelihood of the braking portion getting clipped at $V_{max}$.

In some aspects, the defined offset has a constant value over time. In some aspects, the defined offset (e.g., 995) is a time-varying offset that decreases over time, from an initial offset value toward a signal value at which the haptic actuator 120 returns to a non-energized state. In some cases, the signal value at which the haptic actuator 120 returns to the non-energized state may be the defined rated minimum signal value (e.g., 0 V) or approximately the defined rated minimum signal value, such as when a difference between signal value and the defined rated minimum signal value has a magnitude which is less than a level of background noise. In some aspects, the control circuit 110 may combine (e.g., add) signal values of the time-varying correction signal to respective offset values of the time-varying offset. The time-varying offset in such an example may act as a DC offset, or more generally a large signal component of the braking portion, that decreases over time. In some aspects, the time-varying offset may decrease over time so as to avoid damaging the haptic actuator 120 by, e.g., overheating the haptic actuator 120. For instance, if the time-varying offset acts as a DC offset, the DC offset may deliver a net amount of energy to the haptic actuator 120, in the form of a net amount of positive charge or negative charge, or a net amount of positive or negative potential. If too much net charge or net potential accumulates in the haptic actuator over time, the haptic actuator 120 may overheat, which may damage the haptic actuator 120. Thus, the control circuit 110 may apply a time-varying offset that decreases over time, so as to reduce a net amount of charge or potential that accumulates in the haptic actuator 120. Such a time-varying offset may act as a DC offset or DC bias that decreases over time.

In some cases, the initial offset value for the time-varying offset may be a midpoint or approximately a midpoint of the defined rated maximum signal value for the haptic actuator and the defined rated minimum signal value for the haptic actuator. In the example of FIG. 9A, the initial offset value may be 50 V, or approximately 50 V. In some cases, the initial offset value may be a predefined value stored on, e.g., the non-transitory computer-readable medium 140. In some cases, the control circuit 110 may be configured to calculate the initial offset value by, e.g., averaging the defined rated maximum signal value for the haptic actuator and the defined rated minimum signal value for the haptic actuator 120. Thus, the defined offset may have offset values that are predefined and stored on the non-transitory computer-readable medium 140, or may be defined or otherwise determined by the control circuit 110. In some aspects, the time-varying offset (e.g., 995) may decrease over time based on a sinusoidal function, an exponential function, a linear function, or some other function. For instance, FIG. 10A depicts a time-varying offset 1095A that decreases based on a shape of an exponentially decreasing function, while FIG. 10B depicts a time-varying offset 1095B that decreases based on a shape of a quarter sine wave.

As stated above, the offset may establish a virtual equilibrium position for the haptic actuator 120, wherein the virtual equilibrium position is different from an actual equilibrium position of the haptic actuator 120. In some aspects, the actual equilibrium position of the haptic actuator 120 may be a position of the haptic actuator 120 or a portion thereof when no active drive signal is applied to the haptic actuator 120, such that the haptic actuator 120 is in a non-energized state. In such a situation, there may be no difference in electrical potential (e.g., no voltage difference) applied to the haptic actuator 120. For example, FIG. 11A depicts a situation in which there is no voltage difference between opposite sides of the haptic actuator 420 of FIG. 4, and the haptic actuator 420 is at its actual equilibrium position. In this example, the layer 424 of the excitable material may have an equilibrium thickness of $d_0$. FIG. 11B depicts a situation in which the haptic actuator 420 is at a virtual equilibrium position as a result of a DC offset being applied to the haptic actuator 420, wherein the DC offset is equal to $V_1-V_2$ (e.g., an initial offset value of 50 V), wherein the DC offset may place the haptic actuator 420 in an energized state. In one example, the layer 424 of excitable material in this situation may have a thickness of $d_{virtual}$, which is less than $d_0$. In some aspects, if a positive value of a correction signal is added to the offset, the haptic actuator 120 may cause the layer 424 to deform (e.g., shrink) to a thickness smaller than $d_{virtual}$. This change may be regarded as outputting a displacement in a first direction (e.g., an inward direction, or a pulling direction) relative to the virtual equilibrium position, and may generate a force in the first direction. If a negative value of a correction signal is added to the offset, the haptic actuator 120 may cause the layer 424 to deform (e.g., expand) to a thickness that is greater than $d_{virtual}$ (e.g., or, more specifically, between $d_{virtual}$ and $d_0$). This change may be regarded as outputting a displacement in a second direction (e.g., an outward direction, or pushing direction) relative to the virtual equilibrium position, and may generate a force in the second direction. Thus, the control circuit 110 in this example may cause the haptic actuator 120 to make adjustments to a thickness of the layer 424 relative to $d_{virtual}$, which allows the haptic actuator 120 to output a force in both a first direction and a second direction. If the control circuit 110 causes the offset to decrease over time, then the virtual equilibrium position (e.g., $d_{virtual}$) may gradually approach the actual equilibrium position (e.g., $d_0$) over time, and the haptic actuator 120 may gradually reach the non-energized state.

In some aspects, using the offset may provide symmetric behavior for the haptic actuator 120 relative to the virtual equilibrium position. More specifically, if the braking portion is greater than the offset by a particular value, the haptic actuator 120 may output a certain amount of displacement and/or force in a first direction relative to the virtual equilibrium position. If the braking portion is less than the offset by the same value, the haptic actuator 120 may in some cases output substantially the same amount of displacement and/or force, but in a second and opposite direction relative to the virtual equilibrium position. In other words, the offset may divide a signal domain of the haptic actuator 120 into a first sub-domain which is above the offset, and a second sub-domain which is below the offset. In some implementations, the behavior of the haptic actuator 120 when driven in the first sub-domain may be symmetrical to the behavior of the haptic actuator 120 when driven in the second sub-domain.

In some aspects, the control circuit 110 may be configured to generate the braking portion in a manner that reduces and/or eliminates any sharp discontinuity between an end of the driving portion and a beginning of the braking portion. For instance, the control circuit 110 may generate the braking portion of the drive signal in step 810 further by adjusting at least one portion of the combination (e.g, sum) of the time-varying correction signal and the defined offset to make that sum closer to one or more final values of the driving portion. In an example, the one or more final values of the driving portion may be equal to or approximately zero. In that example, if the braking portion begins with a high positive value, the discontinuity may cause the haptic actuator 120 (e.g., piezoelectric actuator) to generate a sound (e.g., an audible click), which may be undesirable. Thus, the control circuit 110 in this example may scale initial signal values of the braking portion to reduce their magnitude, to bring these initial values closer to zero. In some aspects, the at least one portion that is adjusted may include at least one of: i) signal values of the correction signal that are within a defined initial time window of the braking portion (e.g., an initial 40 msec window of the braking portion), and/or ii) offset values of the offset that are within the defined initial time window. The adjustment (e.g., scaling) may involve, e.g., multiplying signal values of the correction signal by respective adjustment values, and/or multiplying offset values of the offset by the respective adjustment values. In some aspects, the adjustment values may be in a range from 0 and 1, and may increase over the defined initial time window. Thus, the adjustment values earlier in the defined initial time window may be closer to zero, and thus may bias the braking portion toward zero. This level of bias may decrease over time as the adjustment values later in the defined initial time window approach a value of 1. In some aspects, the adjustment values may be from a function that increases over time, such as a portion of a sine function that increases in value over time. Because this function makes a transition between the driving portion and the braking portion more smooth, it may be referred to as a smoothening function.

In step 812, the control circuit 110 may apply the braking portion (e.g., 994) to the haptic actuator 120. As a result, the haptic actuator 120 may counteract residual movement (e.g., residual acceleration) of one or more portions of the haptic-enabled system, such as the actuatable portion 150, so as to reduce or stop that movement. FIG. 9B depicts measured acceleration of one or more portions of the haptic-enabled system like the actuatable portion 150 for the drive signal 990, and more specifically for the driving portion 992 and the braking portion 994. As FIG. 9B depicts, the residual acceleration stops after only one or two cycles, and is considerably shorter relative to the residual acceleration depicted in FIG. 7B, in which no offset is used to generate a braking portion 794. In some aspects, a time at which the control circuit switches from generating and applying a driving portion for a haptic effect in steps 802 and 804 to generating and applying a braking portion in steps 808 to 812 can be based on a ratio between how many peaks are desired for the haptic effect (e.g., if it involves oscillating movement) and a desired frequency of the haptic effect.

In some aspects, the movement (e.g., of the actuatable portion 150) may be a vibration, and the braking portion of the drive signal may cause the vibration to stop before the haptic actuator returns to an equilibrium position, and/or before the haptic actuator returns to a non-energized state. The equilibrium position may be a position of the haptic actuator when no active drive signal has been applied thereto (e.g., when a signal value or drive signal values of zero are applied to the haptic actuator). For example, the equilibrium position may correspond to FIG. 11A, when the layer 424 of the haptic actuator 420 has a thickness of do. When the braking portion has an offset, the haptic actuator may adopt a virtual equilibrium position corresponding to, e.g, FIG. 11B, in which the layer 424 of the haptic actuator 420 has a thickness of $d_{virtual}$. As stated above, if the offset decrease over time, $d_{virtual}$ may gradually return to $d_0$. However, the braking portion may take effect sufficiently quickly such that it causes the vibration to stop before $d_{virtual}$ returns to $d_0$, and/or before a magnitude of the braking portion has dropped below a level of background noise (e.g., before the magnitude of the braking portion has reached zero). In some aspects, the braking portion of method 800 may cause the movement (e.g., of the actuatable portion 150) to stop within, e.g., 40 msec from a beginning of the braking portion.

In the above examples, the braking portion (e.g., 994) may be generated based on a defined offset that is greater than a defined rated minimum signal value for the haptic actuator and less than a defined rated maximum signal value for the haptic actuator. In some cases, this may involve generating a correction signal, and combining (e.g., adding) the defined offset with the correction signal, as discussed above. In some cases, this may omit the generating of a correction signal.

FIGS. 12A and 12B and 13A and 13B depict another comparison of a braking portion which includes an offset versus a braking portion which does not include an offset. More specifically, FIG. 12A illustrates a drive signal having a driving portion 1292 and a braking portion 1294. In the example of FIG. 12A, the braking portion 1294 may be generated without the use of an offset. In some cases, the braking portion 1294 may be equal to a clipped version of a correction signal, which may be generated based on, e.g., PID control. As depicted in FIG. 12A, the braking portion may have several periods 1296A-1296D in which it is clipped at $V_{min}$. FIG. 12B illustrates resulting acceleration of the actuatable portion 150 as a result of the braking portion 1290. More specifically, the actuatable portion 150 has residual oscillation which continues for many cycles after the braking portion 1294 begins to be applied to the haptic actuator 120.

Figure 13A:
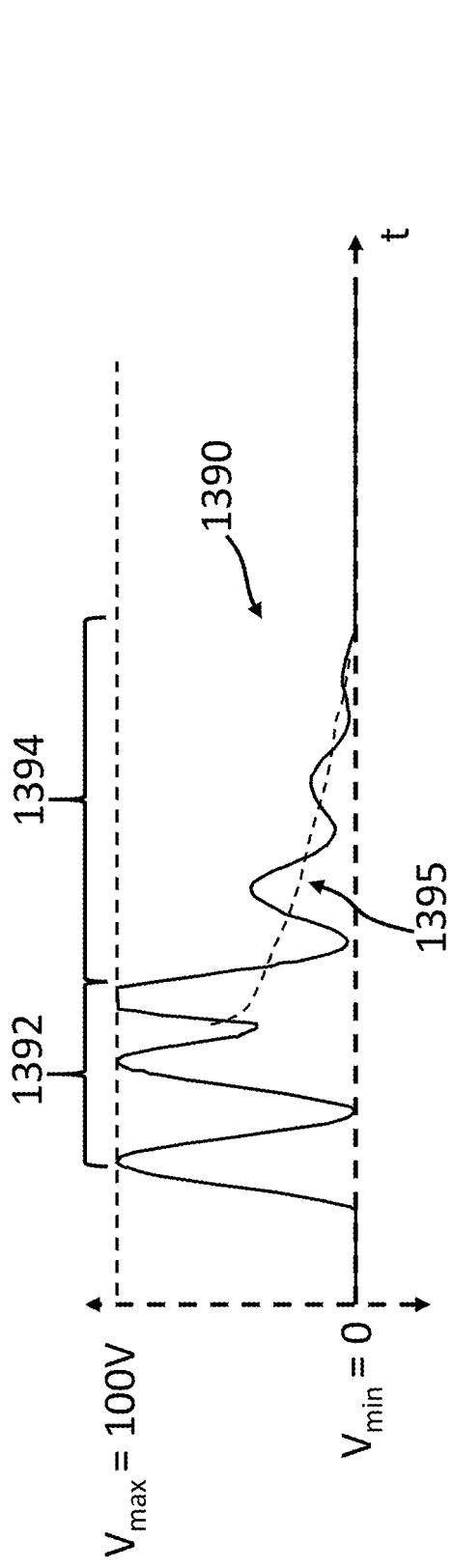
FIGS. 13A and 13B illustrate an example drive signal and acceleration caused by the drive signal, according to an aspect hereof.
Figure 13B:
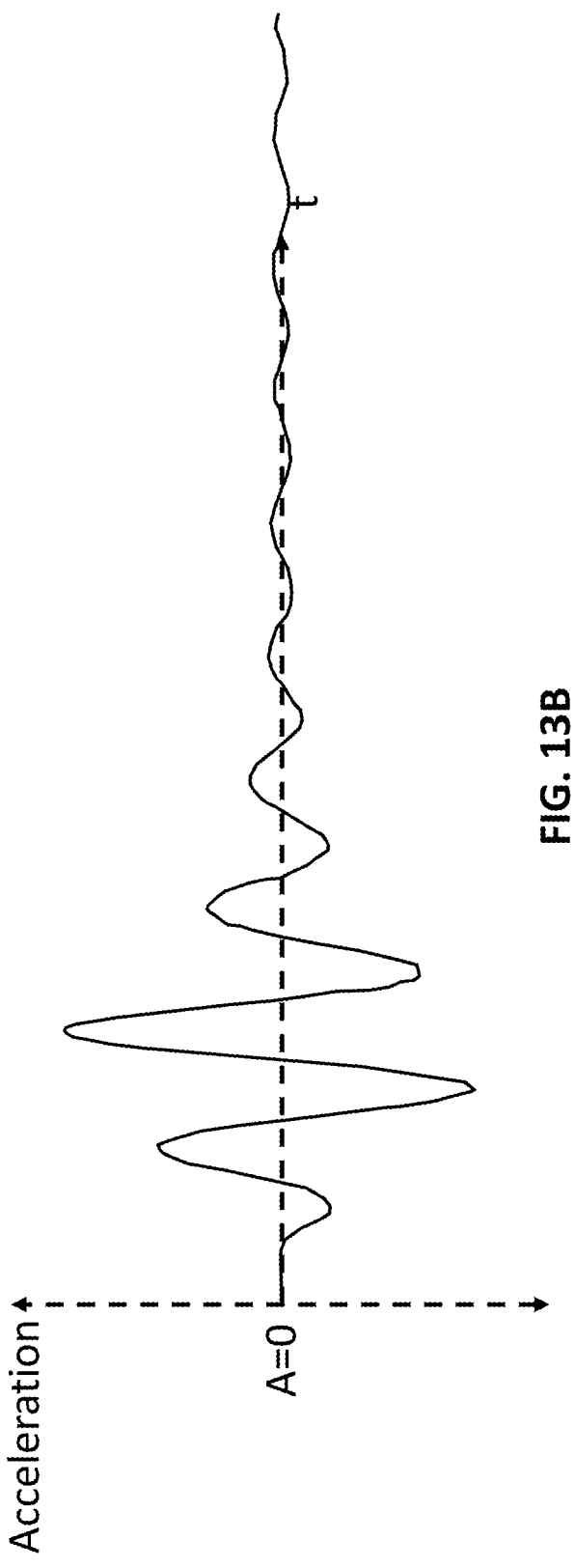

FIG. 13A illustrates a drive signal 1390 having a driving portion 1392, and having a braking portion 1394 that is generated with an offset 1395. In some aspects, the braking portion 1394 may be generated by combining (e.g., adding) the offset with a correction signal. The correction signal may be generated based on, e.g., PID control using the same gains as those used for the braking portion 1294 of the drive signal 1290 in FIG. 12A. FIG. 13B illustrates resulting acceleration of the actuatable portion 150 as a result of the drive signal 1390. More specifically, the residual oscillation depicted in FIG. 13B is much more suppressed relative to the residual oscillation depicted in FIG. 12B.

As discussed above, the control circuit 110 may use the offset to generate a braking portion for a unidirectional haptic actuator, or more specifically may combine the offset with a correction signal. In some aspects, the control circuit 110 may also perform the above steps for a bipolar haptic actuator. In such aspects, the control circuit 110 may calculate the offset as a midpoint of a defined rated maximum signal value and a defined rated minimum signal value of the haptic actuator 120. For a bipolar haptic actuator, this midpoint may simply be zero. In this situation, the control circuit 110 may still perform a step of adding the correction signal to the offset, but the result may still be equal or substantially equal to the correction signal.

In the above examples, the defined rated maximum signal value is 100 V. In other examples, the defined rated maximum signal value may have some other value (e.g., 50 V, 200 V, etc.). In the above examples, the defined rated minimum signal value is 0 V. In other examples, the defined rated minimum signal value may have some other value (e.g., −30 V, −10 V, 5 V, etc.).

Additional Discussion of Various Embodiments

Embodiment 1 relates to a haptic-enabled system, comprising: a haptic actuator, a movement sensor, and a control circuit. The control circuit is configured to: generate a driving portion of a drive signal; apply the driving portion of the drive signal to the haptic actuator to generate or cause movement of one or more portions of or associated with a haptic-enabled system (e.g., movement of an actuatable portion coupled to the haptic actuator); determine, via the movement sensor, movement of the one or more portions of or associated with the haptic-enabled system (e.g., movement of the actuatable portion); determine, based on the movement of the one or more portions of or associated with the haptic-enabled system like the actuatable portion (e.g., the actuatable portion), a time-varying (e.g., time-dependent) correction signal for reducing the movement; generate a braking portion of the drive signal based on a combination of the time-varying correction signal and a defined offset that is greater than a defined rated minimum signal value for the haptic actuator and less than a defined rated maximum signal value for the haptic actuator; and apply the braking portion of the drive signal to the haptic actuator.

Embodiment 2 includes the haptic-enabled system of embodiment 1, wherein the defined offset is a time-varying offset that decreases over time, from an initial offset value toward a signal value at which the haptic actuator returns to a non-energized state.

Embodiment 3 includes the haptic-enabled system of embodiment 2, wherein the control circuit is configured to determine the initial offset value as a midpoint or approximately a midpoint of the defined rated maximum signal value for the haptic actuator and the defined rated minimum signal value for the haptic actuator, and wherein the signal value at which the haptic actuator returns to the non-energized state is the defined rated minimum signal value or approximately the defined rated minimum signal value.

Embodiment 4 includes the haptic-enabled system of embodiment 2 or 3, wherein the control circuit is configured to determine the combination of the time-varying correction signal and the defined offset by adding, superimposing, and/or modulating signal values of the time-varying correction signal and respective offset values of the time-varying offset.

Embodiment 5 includes the haptic-enabled system of any one of embodiments 2-4. The embodiment further comprises a user input device and a suspension structure for mounting the user input device, wherein the one or more portions of the haptic-enabled system in which movement is generated by the driving portion of the drive signal includes at least one of the user input device or the suspension structure, such that movement of the one or more portions of the haptic-enabled system includes movement of the at least one of the user input device or the suspension structure.

Embodiment 6 includes the haptic-enabled system of any one of embodiment 5, wherein the movement that is generated by applying the driving portion of the drive signal to the haptic actuator is a vibration of the suspension structure.

Embodiment 7 includes the haptic-enabled system of embodiment 5 or 6, wherein the suspension structure includes a beam that is elastically deformable.

Embodiment 8 includes the haptic-enabled system of any one of embodiments 2-7, wherein the time-varying offset decreases over time based on at least one of a sinusoidal function, an exponential function, or a linear function.

Embodiment 9 includes the haptic-enabled system of any one of embodiments 1-8, wherein an absolute value of the defined rated minimum signal value for the haptic actuator is different than an absolute value of the defined rated maximum signal value for the haptic actuator.

Embodiment 10 includes the haptic-enabled system of embodiment 9, wherein the defined rated minimum signal value for the haptic actuator is a voltage value or current value that is equal to or greater than zero.

Embodiment 11 includes the haptic-enabled system of any one of embodiments 1-10, wherein the haptic actuator comprises a layer of piezoelectric ceramic material, or a layer of electroactive polymer (EAP) material, or the haptic actuator comprises a solenoid.

Embodiment 12 includes the haptic-enabled system of any one of embodiments 1-11, wherein the movement sensor is an accelerometer configured to measure acceleration of the one or more portions of or associated with the haptic-enabled system, such as the actuatable portion, and the control circuit is configured to determine the time-varying correction signal based on the acceleration.

Embodiment 13 includes the haptic-enabled system of embodiment 12, wherein the control circuit is configured to determine the time-varying correction signal based on a combination of: (i) a multiple of the acceleration of the actuatable portion and (ii) a multiple of the integral of the acceleration.

Embodiment 14 includes the haptic-enabled system of any one of embodiments 1-13, wherein the movement includes a vibration, and wherein the braking portion causes the vibration of the one or more portions (e.g., actuatable portion) to stop before the haptic actuator returns to an actual equilibrium position, wherein the actual equilibrium position is a position of the haptic actuator when no active drive signal has been applied thereto.

Embodiment 15 includes the haptic-enabled system of any one of embodiments 1-14, wherein the control circuit is configured to generate the braking portion of the drive signal further by adjusting at least one portion of the combination of the time-varying correction signal and the defined offset based on a smoothening function and/or adjusting the at least one portion of the combination to be closer to one or more final signal values of the driving portion.

Embodiment 16 includes the haptic-enabled system of embodiment 15, wherein the at least one portion of the combination that is adjusted includes at least one of: i) signal values of the correction signal that are within a defined initial time window of the braking portion, or ii) offset values of the offset that is are within the defined initial time window.

Embodiment 17 relates to a non-transitory computer-readable medium having instructions thereon that, when executed by a control circuit, causes the control circuit to perform functionality in one or more of embodiments 1-16.

Embodiment 18 includes a method of controlling a haptic-enabled system. The method in this embodiment comprises: generating a driving portion of a unipolar drive signal or non-symmetric bipolar drive signal; applying the driving portion of the unipolar drive signal or non-symmetric bipolar drive signal to a haptic actuator of the haptic-enabled system; generating a braking portion of the unipolar drive signal or non-symmetric bipolar drive signal based on a defined offset that is greater than a defined rated minimum signal value for the haptic actuator and less than a defined rated maximum signal value for the haptic actuator; and applying the braking portion of the unipolar drive signal or non-symmetric bipolar drive signal to the haptic actuator.

Embodiment 19 includes the method of embodiment 18, and further comprises: receiving feedback associated with movement caused by the haptic actuator; and determining, based on the feedback, a time-varying correction signal for reducing the movement caused by the haptic actuator.

Embodiment 20 includes the method of embodiment 19, wherein generating the braking portion of the unipolar drive signal or non-symmetric bipolar drive signal is further based on the time-varying correction signal.

Embodiment 21 includes the method of any one of embodiments 18-20, wherein the defined offset is a time-varying offset that decreases, based on at least a portion of a sine wave, over time.

Embodiment 22 includes the method of any one of embodiments 18-21, further comprising smoothening at least a portion of the unipolar drive signal or non-symmetric bipolar drive signal.

Embodiment 23 includes a haptic-enabled system, comprising: a haptic actuator; a movement sensor; and a control circuit. The control circuit is configured to: generate a driving portion of a drive signal; apply the driving portion of the drive signal to the haptic actuator to cause movement for a haptic effect; determine residual movement via the movement sensor, wherein the residual movement is movement caused by the driving portion and that remains after an end of the driving portion, determine, based on the residual movement, a time-varying correction signal for reducing the residual movement; and generate a braking portion of the drive signal based on a combination of the time-varying correction signal and a defined offset that is greater than a defined rated minimum signal value for the haptic actuator and less than a defined rated maximum signal value for the haptic actuator; and apply the braking portion of the drive signal to the haptic actuator.

Embodiment 24 includes the haptic-enabled system of embodiment 23, wherein the residual movement is movement of an actuatable portion coupled to the haptic actuator.

Embodiment 25 includes the haptic-enabled system of embodiment 24, wherein the defined offset has a property of any one of embodiments 2-16, and the actuatable portion has a property of any one of embodiments 2-16.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A haptic-enabled system, comprising:
a haptic actuator;
a movement sensor;
a control circuit configured to:
generate a driving portion of a drive signal;
apply the driving portion of the drive signal to the haptic actuator to generate movement of one or more portions of the haptic-enabled system;
determine, via the movement sensor, the movement of the one or more portions of the haptic-enabled system,
determine, based on the movement of the one or more portions of the haptic-enabled system, a time-varying correction signal for reducing the movement; and
generate a braking portion of the drive signal based on a combination of the time-varying correction signal and time-varying offset that decreases over time and is greater than a defined rated minimum signal value for the haptic actuator and less than a defined rated maximum signal value for the haptic actuator; and
apply the braking portion of the drive signal to the haptic actuator.

2. The haptic-enabled system of claim 1, wherein the time-varying offset decreases from an initial offset value toward a signal value at which the haptic actuator returns to a non-energized state.

3. The haptic-enabled system of claim 2, wherein the control circuit is configured to determine the initial offset value as a midpoint or approximately a midpoint of the defined rated maximum signal value for the haptic actuator and the defined rated minimum signal value for the haptic actuator, and wherein the signal value at which the haptic actuator returns to the non-energized state is the defined rated minimum signal value or approximately the defined rated minimum signal value.

4. The haptic-enabled system of claim 2, wherein the control circuit is configured to determine the combination of the time-varying correction signal and the time-varying offset by adding signal values of the time-varying correction signal and respective offset values of the time-varying offset.

5. The haptic-enabled system of claim 2, further comprising a user input device and a suspension structure for mounting the user input device, wherein the one or more portions of the haptic-enabled system in which movement is generated by the driving portion of the drive signal includes at least one of the user input device or the suspension structure, such that movement of the one or more portions of the haptic-enabled system includes movement of the at least one of the user input device or the suspension structure.

6. The haptic-enabled system of claim 5, wherein the movement that is generated by applying the driving portion of the drive signal to the haptic actuator is a vibration of the suspension structure.

7. The haptic-enabled system of claim 5, wherein the suspension structure includes a component that is elastically deformable.

8. The haptic-enabled system of claim 2, wherein the time-varying offset decreases over time based on at least one of a sinusoidal function, an exponential function, or a linear function.

9. The haptic-enabled system of claim 1, wherein an absolute value of the defined rated minimum signal value for the haptic actuator is different than an absolute value of the defined rated maximum signal value for the haptic actuator.

10. The haptic-enabled system of claim 9, wherein the defined rated minimum signal value for the haptic actuator is a voltage value or current value that is equal to or greater than zero.

11. The haptic-enabled system of claim 9, wherein the haptic actuator comprises a layer of piezoelectric ceramic material.

12. The haptic-enabled system of claim 1, wherein the movement sensor is an accelerometer configured to measure acceleration of the one or more portions of the haptic-enabled system, and the control circuit is configured to determine the time-varying correction signal based on the acceleration.

13. The haptic-enabled system of claim 12, wherein the control circuit is configured to determine the time-varying correction signal based on a combination of: (i) a multiple of the acceleration of the one or more portions of the haptic-enabled system and (ii) a multiple of an integral of the acceleration.

14. The haptic-enabled system of claim 1, wherein the movement of the one or more portions of the haptic-enabled system includes a vibration, and wherein the braking portion causes the vibration of the one or more portions of the haptic-enabled system to stop before the haptic actuator returns to an actual equilibrium position, wherein the actual equilibrium position is a position of the haptic actuator when no active drive signal has been applied thereto.

15. The haptic-enabled system of claim 1, wherein the control circuit is configured to generate the braking portion of the drive signal further by adjusting at least one portion of the combination of the time-varying correction signal and the time-varying offset based on a smoothening function and/or adjusting the at least one portion of the combination to be closer to one or more final signal values of the driving portion.

16. The haptic-enabled system of claim 15, wherein the at least one portion of the combination that is adjusted includes at least one of: i) signal values of the correction signal that are within a defined initial time window of the braking portion, or ii) offset values of the offset that is are within the defined initial time window.

17. A non-transitory computer-readable medium having instructions thereon that, when executed by a control circuit of a haptic-enable system, causes the control circuit to:
generate a driving portion of a drive signal;
apply the driving portion of the drive signal to a haptic actuator to generate movement of one or more portions of the haptic-enabled system;
determine, via a movement sensor, the movement of the one or more portions of the haptic-enabled system,
determine, based on the movement of the one or more portions of the haptic-enabled system, a time-varying correction signal for reducing the movement; and
generate a braking portion of the drive signal based on a combination of the time-varying correction signal and a time-varying offset that decreases over time and is greater than a defined rated minimum signal value for the haptic actuator and less than a defined rated maximum signal value for the haptic actuator; and
apply the braking portion of the drive signal to the haptic actuator.

18. The non-transitory computer-readable medium of claim 17, wherein the time-varying offset decreases from an initial offset value toward a signal value at which the haptic actuator returns to a non-energized state.

19. The non-transitory computer-readable medium of claim 18, wherein the instructions, when executed by the control circuit, further cause the control circuit to determine the initial offset value as a midpoint or approximately a midpoint of the defined rated maximum signal value for the haptic actuator and the defined rated minimum signal value for the haptic actuator.

20. The non-transitory computer-readable medium of claim 18, wherein the instructions, when executed by the control circuit, further cause the control circuit to determine the combination of the time-varying correction signal and the time-varying offset by adding signal values of the time-varying correction signal and respective offset values of the time-varying offset.

21. A method of controlling a haptic-enabled system, comprising:
generating a driving portion of a unipolar drive signal or non-symmetric bipolar drive signal, wherein the non-symmetric bipolar drive signal is a signal in which a maximum signal value of the signal and a minimum signal value of the signal are different in magnitude;
applying the driving portion of the unipolar drive signal or non-symmetric bipolar drive signal to a haptic actuator of the haptic-enabled system;
generating a braking portion of the unipolar drive signal or non-symmetric bipolar drive signal based on a defined offset that is greater than a defined rated minimum signal value for the haptic actuator and less than a defined rated maximum signal value for the haptic actuator; and
applying the braking portion of the unipolar drive signal or non-symmetric bipolar drive signal to the haptic actuator.

22. The method of claim 21 further comprising:
receiving feedback associated with movement caused by the haptic actuator; and
determining, based on the feedback, a time-varying correction signal for reducing the movement caused by the haptic actuator.

23. The method of claim 22, wherein generating the braking portion of the unipolar drive signal or non-symmetric bipolar drive signal is further based on the time-varying correction signal.

24. The method of claim 21, wherein the defined offset is a time-varying offset that decreases, based on at least a portion of a sine wave, over time.

25. The method of claim 21, further comprising smoothening at least a portion of the unipolar drive signal or non-symmetric bipolar drive signal.

* * * * *